(12) United States Patent
Hagano et al.

(10) Patent No.: US 7,048,138 B2
(45) Date of Patent: May 23, 2006

(54) CAP DEVICE

(75) Inventors: Hiroyuki Hagano, Aichi-ken (JP);
Masayuki Nakagawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 185 days.

(21) Appl. No.: 10/622,827

(22) Filed: Jul. 21, 2003

(65) Prior Publication Data

US 2004/0256392 A1   Dec. 23, 2004

(30) Foreign Application Priority Data

Jul. 22, 2002 (JP) .............................. 2002-212785
Sep. 26, 2002 (JP) .............................. 2002-281576

(51) Int. Cl.
*B60D 53/00* (2006.01)

(52) U.S. Cl. .............................. 220/304; 220/DIG. 33
(58) Field of Classification Search ................ 220/781, 220/DIG. 33, DIG. 32, 303, 304, 288, 367
See application file for complete search history.

(56) References Cited

U.S. PATENT DOCUMENTS

| | | | | |
|---|---|---|---|---|
| 4,676,390 A | * | 6/1987 | Harris | 220/203.06 |
| 4,678,097 A | * | 7/1987 | Crute | 220/288 |
| 4,993,578 A | * | 2/1991 | Kerby | 220/257.1 |
| 5,183,173 A | * | 2/1993 | Heckman | 220/203.07 |
| 5,638,975 A | * | 6/1997 | Harris | 220/288 |
| 6,325,233 B1 | * | 12/2001 | Harris | 220/288 |
| 6,739,472 B1 | * | 5/2004 | Newport | 220/293 |
| 6,763,966 B1 | * | 7/2004 | Harris | 220/293 |

FOREIGN PATENT DOCUMENTS

| | | |
|---|---|---|
| JP | 10/302988 | 12/1998 |
| JP | A-10-329861 | 12/1998 |

* cited by examiner

*Primary Examiner*—Lien M. Ngo
(74) *Attorney, Agent, or Firm*—Posz Law Group, PLC

(57) ABSTRACT

A fuel cap has a torque member attached to an upper portion of a casing body. The torque member is a disk-shaped plate to transmit a rotational torque applied to a handle to the casing body. An interlocking recess and interlocking claws, which constitute a plate attachment mechanism, are arranged on the upper portion of the casing member. Fitting of the interlocking claws in the interlocking recess causes the torque member to be attached to the casing body in a freely rotatable manner. This simple structure of the invention effectively prevents the fuel cap from being easily damaged by an inadvertent operation, such as a careless drop of the fuel cap, and ensures the sufficient sealing properties of the fuel cap even under application of an external load.

10 Claims, 24 Drawing Sheets

CAP DEVICE

This application claims the benefit of and priority from Japanese Applications No. 2002-212785 filed Jul. 22, 2002 and No. 2002-281576 filed Sep. 26, 2002, the contents of which are incorporated herein by reference.

BACKGROUND OF THE INVENTION

1. Field of the Invention

The present invention relates to a cap device that is detachably attached to a tank opening member.

2. Description of the Related Art

One known example of the cap device is disclosed in JP No. 10-329861A. FIG. 38 is a partly broken view illustrating a prior art fuel cap 200 for a vehicle. The fuel cap 200 includes a casing body 202, and a cover 210 attached to an upper flange 204 of the casing body 202. The flange 204 has an outer ring element 206 for fixation of the cover 210 and a linkage element 208 for linkage with the casing body 202. The linkage element 208 has a fragile portion including a notch 209. The fragile portion makes a starting point of breaking the linkage element 208 when a large external force in any of diverse directions is applied to the flange 204 via the cover 210. In the case of application of a large external force onto the periphery of the fuel cap 200, for example, due to a collision of the vehicle, this structure breaks the linkage element 208 at the fragile portion and thereby keeps the sealing properties of a fuel tank from the outside.

The fuel cap 200 of the prior art structure may, however, be broken at the fragile portion to be unusable even by a simple inadvertent use other than a collision of the vehicle, for example, a careless drop of the fuel cap 200 during fuel supply or application of a twisting static load to the lower end of the cover 210.

Setting the breaking load at the fragile portion to a specific range of loading, which excludes the possible load level in the case of the inadvertent use, however, has lots of difficulties, since the setting is adjustable only by the direction and the depth of the notch 209 in the narrow flange 204.

SUMMARY OF THE INVENTION

The object of the present invention is thus to solve the drawback of the prior art technique and to provide a cap device of a simple structure that is not easily damaged by an inadvertent operation, such as a careless drop of a cap, and ensures the sufficient sealing properties even under application of an external load.

To solve the above problem, the present invention provides a cap device that opens and closes a tank opening. The cap device comprises a closer that closes the tank opening, a handle mechanism operable to open and close the tank opening, a disk-shaped torque member that is rotatably mounted on the closer, the torque member being configured to transmit rotational torque applied to the handle mechanism to open and close the tank opening to the closer and a plate attachment mechanism that rotatably attaches the torque member to the closer. The plate attachment mechanism is configured such that part of the torque member is elastically deforms by an external force applied to the handle mechanism, thereby detaching the torque member from the closer.

In the cap device of the present invention, when a rotational torque either in the closing direction or in the opening direction is applied to the manipulation mechanism in the state of the closer set on the tank opening, the rotational torque is transmitted via the torque member to the closer and makes the closer close the tank opening.

The torque member is attached to the closer in a rotatable manner by the plate attachment mechanism. The plate attachment mechanism is configured to elastically deform part of the torque member or part of the closer, so as to be coupled with and released from the closer. The torque member is thus readily attached to and detached from the closer by elastic deformation of the constituent of the plate attachment mechanism, which corresponds to part of the torque member or part of the closer.

The load of making the torque member detached from the closer is readily set by changing the shape and the number of the elastically deformed constituents of the plate attachment mechanism or their mechanical strength. This arrangement thus facilitates optimized setting of the breaking load against external forces in a diversity of directions with no restriction by the shape of the sealing portion of the closer.

The plate attachment mechanism supports the torque member on the closer in a rotatable manner. This structure desirably reduces a variation in rotational torque due to a displacement of the torque member in the diametral direction or in the vertical direction, thus ensuring a stable clamping force to attain the sufficient sealing properties.

In one preferable application of the present invention, the cap device further includes a handle attachment mechanism that supports the manipulation mechanism on a circumference of the torque member in a freely rotatable manner. Elastic deformation of the handle attachment mechanism, which corresponds to part of the torque member, attains attachment and detachment of a cover member and a handle included in the manipulation mechanism. This arrangement facilitates attachment and detachment of the cover member and the handle from the torque member and ensures easy disengagement of the cover member or the handle under application of an external force.

A careless drop of the cap during fuel supply may apply a large external force to the cap and cause the cover member or the handle to be detached from the torque member. The detached cover member or handle can be attached again to the torque member by elastic deformation of he handle attachment mechanism. This arrangement desirably prevents the cap device from being unusable only by a careless drop of the cap, unlike the prior art cap that is easily broken at the fragile portion.

In one preferable embodiment of the above application, the manipulation mechanism includes a handle, and a cover member that is joined with the handle and encircles an upper portion and the circumference of the torque member. The handle attachment mechanism includes an elastically deformable interlocking claw formed on one of the cover member and the torque member, and a matched interlocking element formed on the other of the cover member and the torque member to engage with the interlocking claw.

DESCRIPTION OF THE PREFERRED EMBODIMENTS (1) General Structure of Fuel Cap 10

Figure 1:
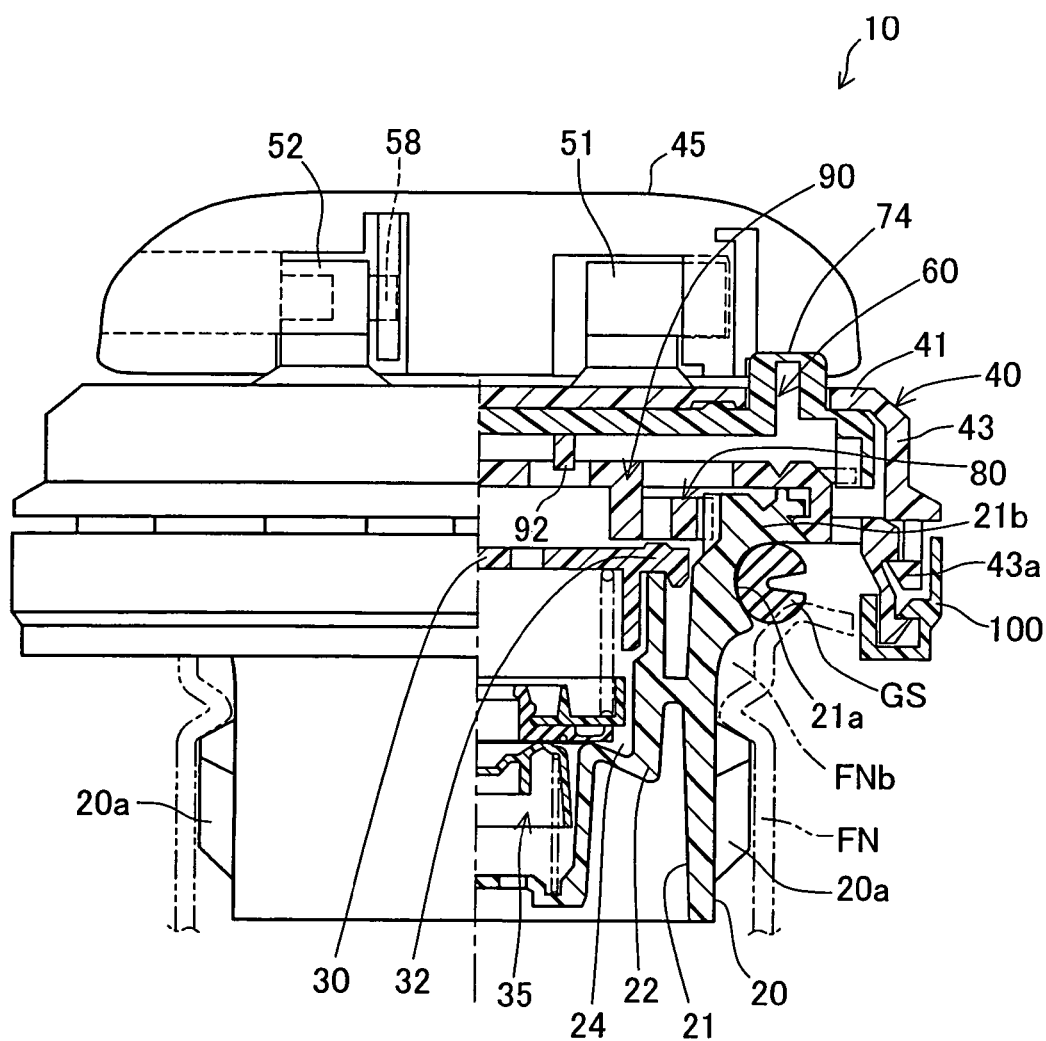
FIG. 1 is an illustrative diagram showing in partial cutaway a cap device comprising a fuel cap pertaining to a first embodiment of the invention.

FIG. 1 is an illustrative diagram showing in partial cutaway a cap device comprising a fuel cap 10 (cap) pertaining to a first embodiment of the invention. In FIG. 1, the fuel cap 10 is attached to a filler neck FN having a filler opening FNb (tank opening) for supplying fuel to a fuel tank, not shown. The cap 10 comprises a casing body 20 (closer) made of polyacetal or other synthetic resin material, an inner cover 30 closing the upper opening of the casing body 20, forming a valve chamber 24; a regulator valve 35 housed within the valve chamber 24; a cover 40 made of nylon or other synthetic resin and mounted on the upper portion of the casing body 20; a handle 45 mounted on the upper face of the cover 40; a clutch mechanism 60 and the torque transmission mechanism 80 (interconnecting mechanism); a tether mechanism 100; and a gasket GS installed on the outside rim of the upper portion of the casing body 20 to provide a seal between the casing body 20 and the filler neck FN.

Figure 2:
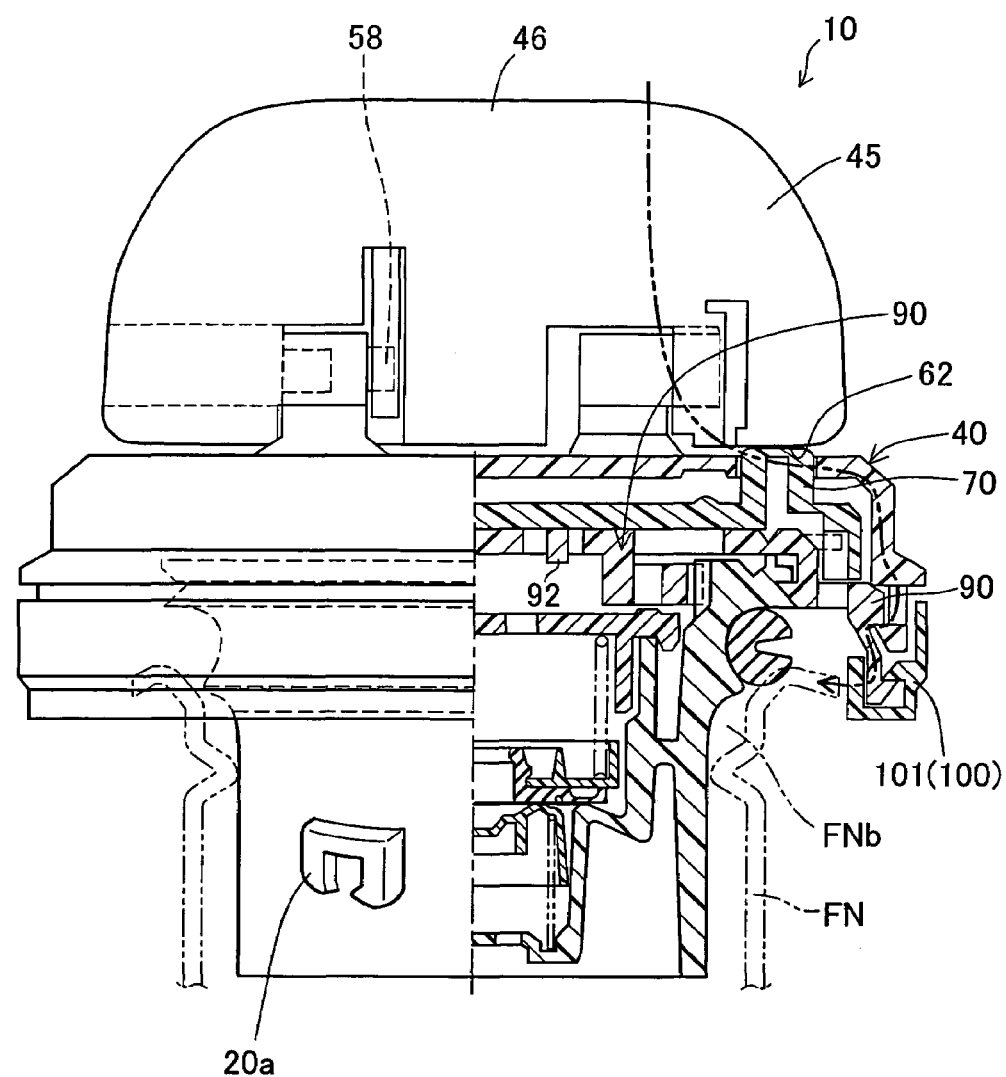
FIG. 2 is an illustrative diagram showing in partial cutaway a cap device rotatable by grasping the handle with the fingers and raising it up.

In the fuel cap 10 shown in FIG. 2, grasping the handle 45 and raising it upward while rotating allows the fuel cap 10 to be attached to or detached from the filler neck FN to close or open the filler opening FNb. External pressure in the opening direction applied to the cover 40 and the handle 45 in the upper portion of the fuel cap 10 will simply cause it to turn freely, so that the fuel cap 10 does not come away from the filler neck FN.

(2) Arrangement of Parts

The various parts of the fuel cap 10 pertaining to the present embodiment are described in detail hereinbelow.

(2)-1 The Casing Body 20

In FIG. 1, the casing body 20 comprises a substantially round outer tube 21 and a valve chamber molding 22 integrally provided to the interior of the outer tube 21. The valve chamber molding 22 houses a positive pressure valve and negative pressure valve that function as a regulator valve 35. The inner cover 30 is welded by an ultrasonic welding technique onto the upper portion of the valve chamber molding 22 to form the valve chamber 24.

The gasket GS is installed to the outside of the bottom edge of a flange 21b in the upper portion of the casing body 20. The gasket GS is interposed between a seal retaining portion 21a of the flange 21b and the filler opening FNb of the filler neck FN so as to be forced against the seating face of the filler neck FN when the fuel cap 10 is tightened in the filler opening FNb, providing a sealing action.

Figure 3:
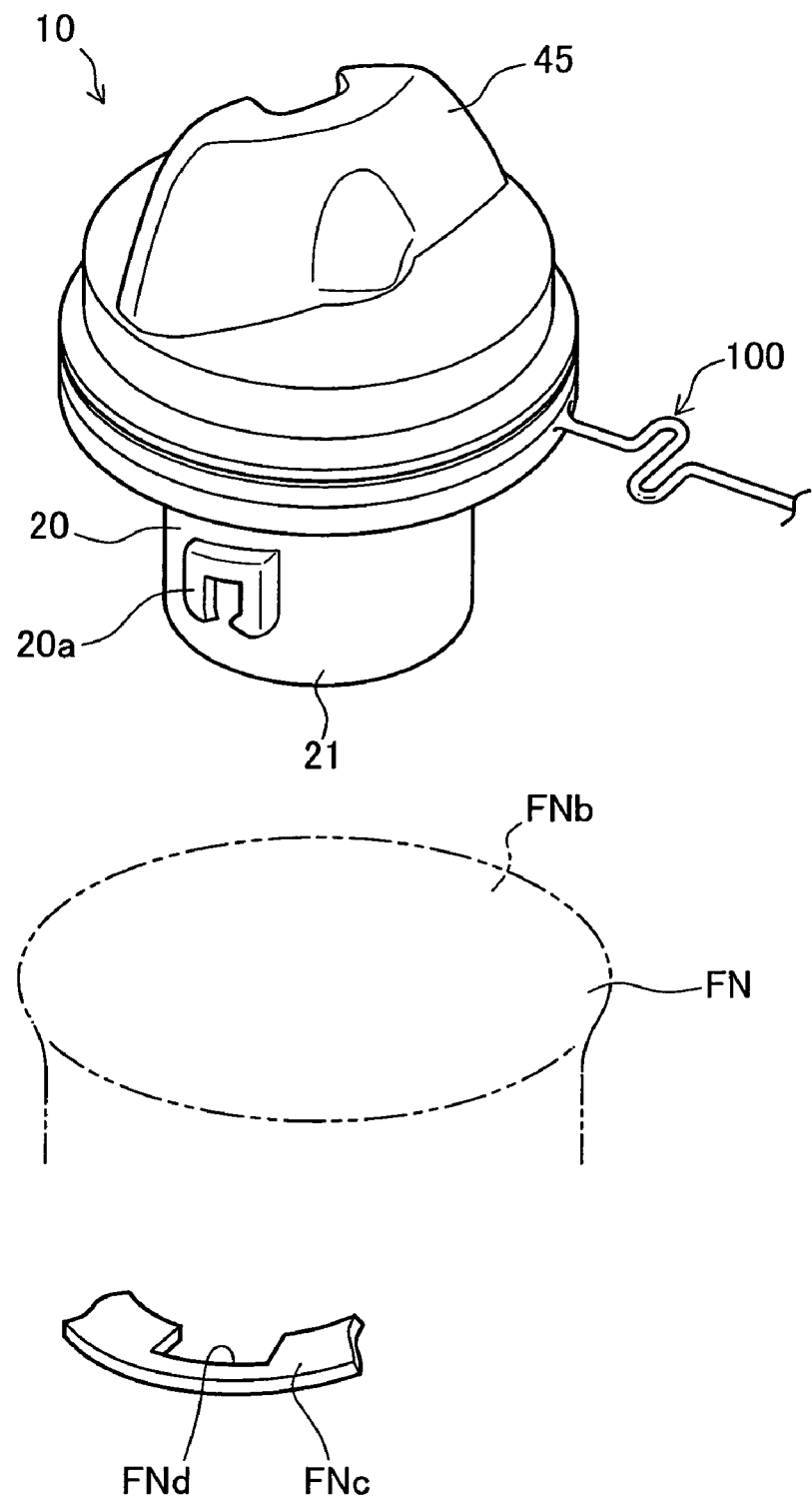
FIG. 3 is an illustrative diagram showing the relationship of the casing interlocking portion of the casing body to the filler neck.

FIG. 3 is an illustrative diagram showing the relationship of the casing interlocking portion 20a of the casing body 20 to the filler neck FN. The casing interlocking portion 20a is formed on the bottom outside wall of the outer tube 21. A opening interlocking portion FNc is formed on the inside wall of the filler neck FN. In a portion of the inside wall of the opening interlocking portion FNc is formed a neck insertion notch FNd into which the casing interlocking portion 20a is insertable in the axial direction. With the casing interlocking portion 20a aligned with the neck insertion notch FNd and the fuel cap 10 inserted into filler opening FNb of the filler neck FN, turning the fuel cap 10 by a predetermined angle (about 90°) causes the casing interlocking portion 20a to be engaged by the opening insertion notch FNc to attach the fuel cap 10 to the filler neck FN.

(2)-2 Inner Cover 20

As shown in FIG. 1, the inner cover 30 has a flange 32 formed on the outside wall of the inner cover 30, the bottom edge of the flange 32 being ultrasonically welded to the top of the valve chamber molding 22.

(2)-3 Structure of the Cover 40

The cover 40 comprises an upper wall 41 and a side wall 43 formed at the outside rim of the upper wall 41, integrally molded in a cup configuration. Support projections 43a extend from the lower interior of the side wall 43. The support projections 43a are arranged at six equidistant locations along the inside rim of the side wall 43. The support projections 43a mate with the outside rim of the torque member 90 of the torque transmission mechanism 80 to rotatably attach the cover 40 to the casing body 20 via the torque member 90. The cover 40 attachment structure is described in detail later.

Figure 4:
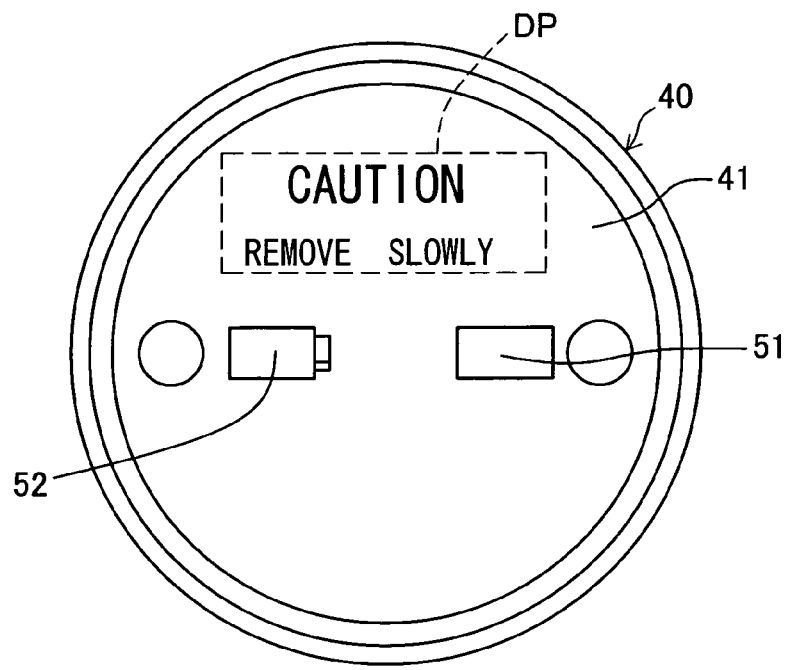
FIG. 4 is a plan view showing the cover.

FIG. 4 is a plan view showing the cover 40. The cover 40 is made of polyamide (PA), polyethylene (PP), acrylonitrile-butadiene-styrene (ABS) or polycarbonate (PC). The cover 40 is made of conductive resin material so as to constitute part of a ground path, indicated by the double-dotted lines in FIG. 2. The conductive resin material may be imparted with electrical conductivity by adding a metal filler (e.g. stainless steel, nickel, chromium, zinc, copper, aluminum, gold, silver, magnesium or titanium filler or some combination thereof) etc. Metal filler content is from 1 to 30 wt %. The reason is that amounts of less than 1 wt % do not give electrical conductivity, whereas in excess of 30 wt % the resin becomes highly viscous in injection molding process of the cover 40, possibly resulting in injection molding defects due to metal filler clogging or pooling.

An indicia portion DP is formed on the surface of the upper wall 43 of the cover 40. The indicia portion DP comprises of indicia such as text describing function, warning, description line, record or bar code, marked by laser irradiation. 0.01 to 3 wt % of carbon is added for the purpose of laser irradiation. Marking by laser irradiation is not possible with carbon content below 0.01 wt %, whereas in excess of 3 wt % the energy of the laser is absorbed by the cover 40 as a whole, so that localized coloration in the indicia portion DP is not possible.

(2)-4 Structure of Handle 45

Figure 5:
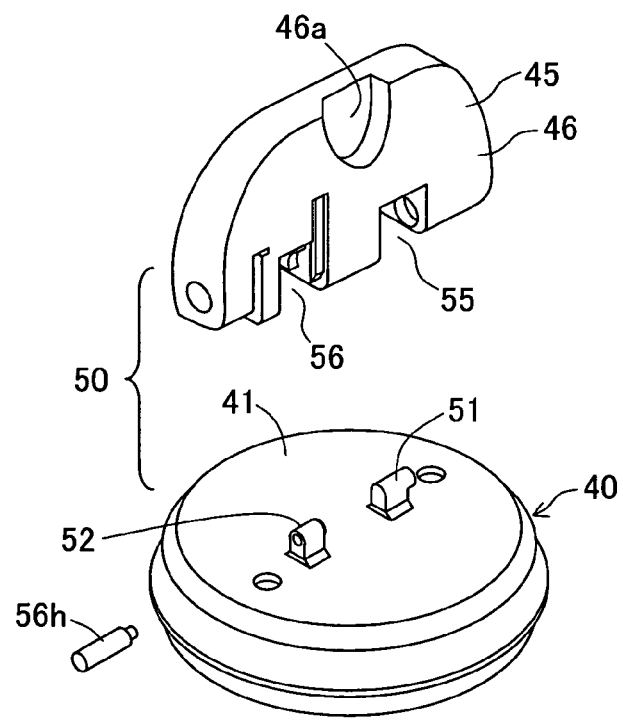
FIG. 5 is a perspective view showing parts on top of the fuel cap disassembled.

FIG. 5 is a perspective view showing parts on top of the fuel cap disassembled. The handle 45 comprises a rectangular handle body 46 with chamfered corners. The handle body 46 is of semicircular configuration having an actuating recess 46a produced by recessing its outside edge at the center. The actuating recess 46a serves as a recessed location for inserting a finger to provide ease of operation when the handle 45 has been lowered into the retracted position (see FIG. 1).

(2)-5 Axial Support Mechanism 50

The handle 45 is rotatably mounted on the upper wall 41 of the cover 40 by means of an axial support mechanism 50. The axial support mechanism 50 comprises axial support portions 51, 51 projecting from the upper wall 41 of the cover 40, and axially supported portions 55, 56 formed on the handle 45 and rotatably supported by the axial support portions 51, 52.

(2)-5-1 Axial Support Portions 51, 52

Figure 6:
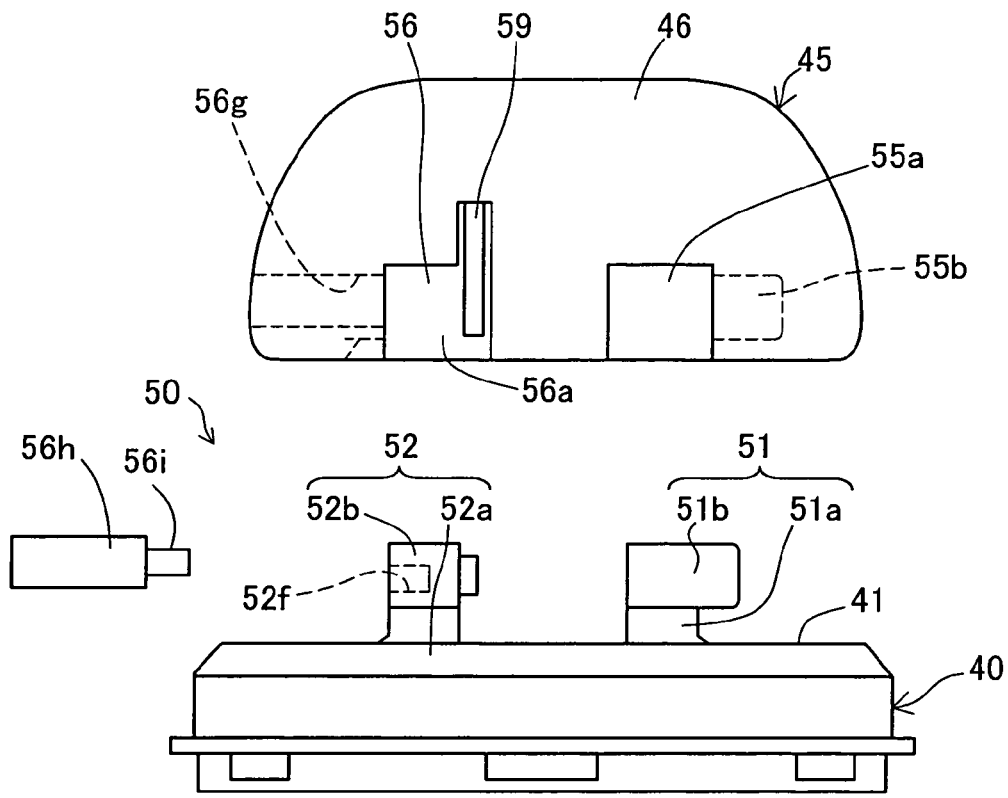
FIG. 6 is a front view showing the handle detached from the cover.

FIG. 6 is a front view showing the handle 45 detached from the cover 40. The axial support portions 51, 52 are members for rotatably supporting the handle 45 and are provided in a pair in the center of the cover 40. The axial support portion 51 comprises a leg portion 51a and an axle portion 51b projecting from the side of the leg portion 51a, and the handle 45 is rotatable about the axle portion 51b while supported thereby. The axial support portion 52 comprises a leg portion 52a and an axle portion 52b projecting from the top of the leg portion 52a. An axle hole 52f is formed in the side of the axle portion 52b.

(2)-5-2 Axially Supported Portions 55, 56

The axially supported portions 55, 56 are formed extending from the bottom to the center of the handle 45 and are provided so that the handle 45 may be supported via the axial support portions 51, 52 provided on the cover 40. The axially supported portion 55 comprises an opening 55a open at the bottom and at one side of the handle 45, and an axle hole 55b of round cross section communicating with the opening 55a in the axial direction. The opening 55a and the axle hole 55b are configured to axially support the axle portion 51b of the axial support portion 51.

Figure 7:
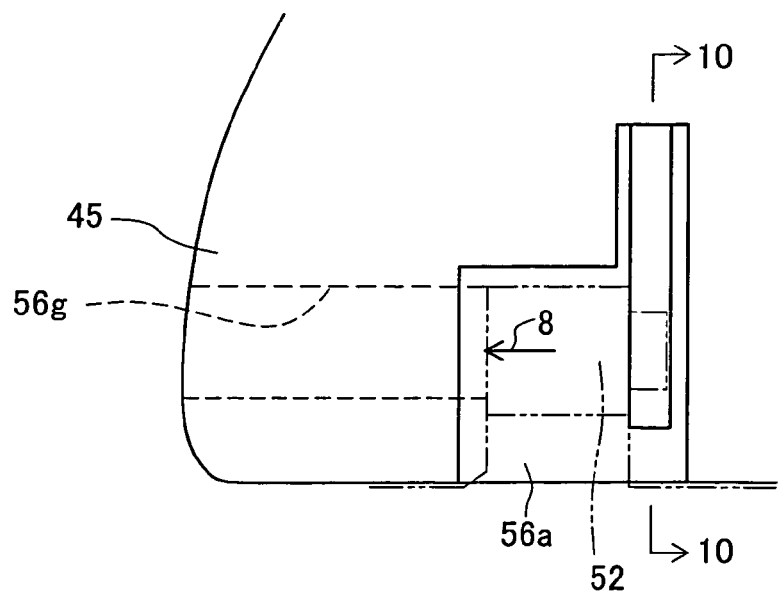
FIG. 7 is a front view showing an enlargement of the area around the axially supported portion of FIG. 6.
Figure 8:
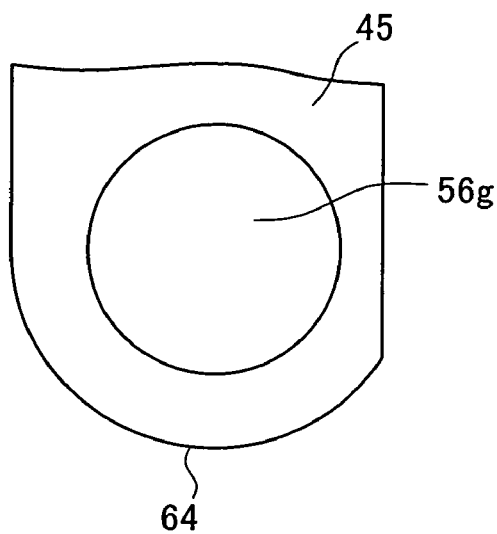
FIG. 8 is a diagram viewed in the direction of arrow 8 in FIG. 7.

The axially supported portion 56 comprises an opening 56a, and has a pin mounting hole 56g connecting with the opening 56a. FIG. 7 is a front view showing an enlargement of the area around the axially supported portion 56 of FIG. 6, and FIG. 8 is a diagram viewed in the direction of arrow 8 in FIG. 7. The pin mounting hole 56g communicating with the opening 56a is formed on the side of the opening 56a. Pin mounting hole 56g passes through the side of the handle 45. A pin 56h fits into the pin mounting hole 56g. The distal end of the pin 56h has a support insert 56i for insertion into an axle hole 52f.

(2)-5-3 Assembly of the Handle 45

Figure 9:
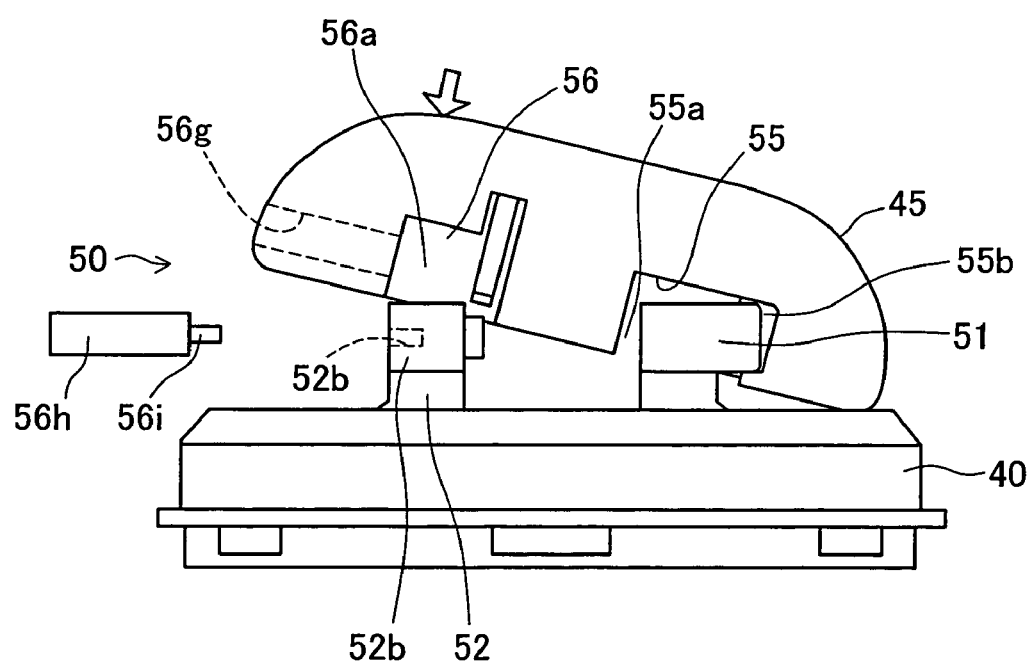
FIG. 9 is an illustrative diagram illustrating the procedure for assembling the handle to the cover.

FIG. 9 is an illustrative diagram illustrating the procedure for assembling the handle 45 to the cover 40. To assemble the handle 45 to the cover 40 by means of the axial support mechanism 50, the axial support portion 51 is mated with the axially supported portion 55, and then the axial support portion 51 is inserted into the opening 56a of the axially supported portion 56, the inserting the pin 56h into the pin mounting hole 56g; finally, the support insert 56i is mated with the axle hole 52. In this way the handle 45 may be rotatably mounted on the cover 40 via the axial support mechanism 50.

(2)-5-4 Urging Mechanism 57

Figure 10:
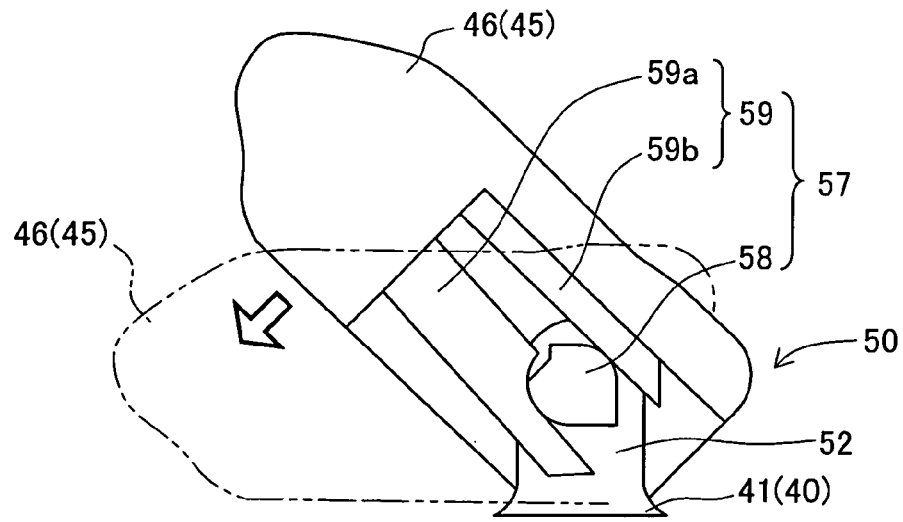
FIG. 10 is a sectional view taken along line 10—10 in FIG. 7.
Figure 11:
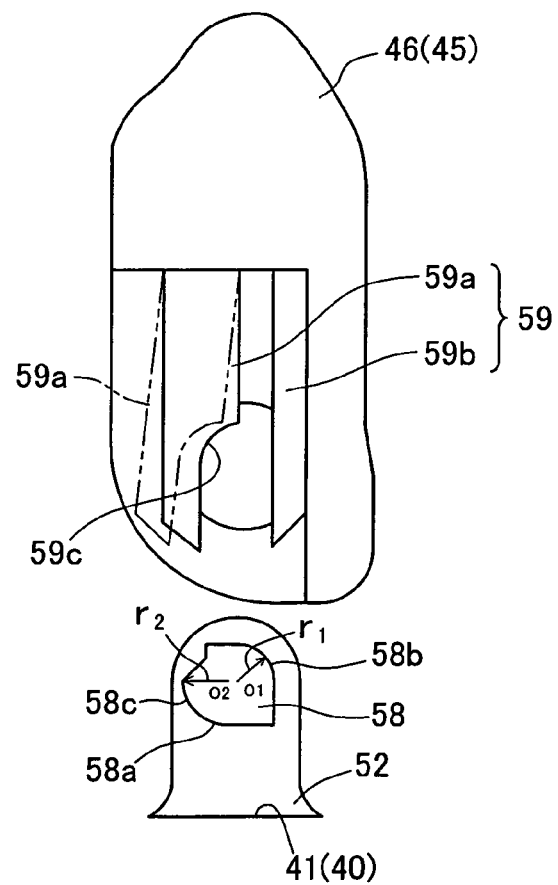
FIG. 11 is a sectional view showing the handle prior to being assembled with the axial support portion.

FIG. 10 is a sectional view taken along line 10—10 in FIG. 7, and FIG. 11 is a sectional view showing the handle 45 prior to being assembled. The handle 45 is urged towards the retracted position by means of the urging mechanism 57. The urging mechanism 57 comprises a cam 58 projecting from the side of the axial support portion 52, and a cam support portion 59 provided to the handle 45. In FIG. 11, a cam face 58a of the cam 58 is defined by center axis O1, an arcuate face 58b of substantially semicircular configuration of radius r1, a center O2 offset from center axis O1, and a curving convex face 58c of radius r2. The cam support portion 59 is bifurcated so that the cam face 58a is held between a resilient cam support piece 59a and a cam support rib 59b. The resilient cam support piece 59a is configured as a cantilever piece that resiliently flexes while following the cam face 58a as the handle 45 rotates. On the inside of the resilient cam support piece 59a is formed a cam guide face 59c conforming in shape to the arcuate face 58b. The cam support rib 59b is integrally formed with the handle body 46 and is arranged substantially parallel to the resilient cam support piece 59a.

Figure 12A:
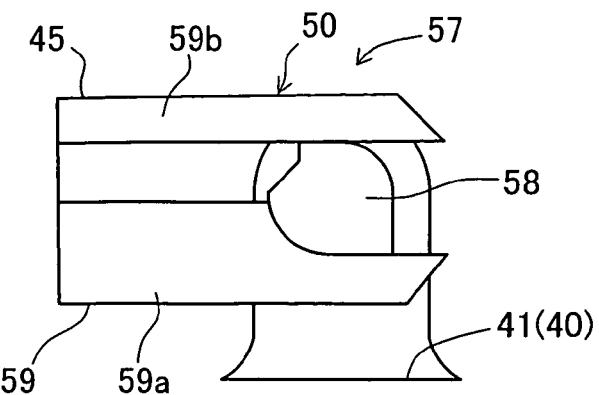
FIGS. 12A, 12B and 12C are illustrative diagrams illustrating the procedure for rotating the handle.
Figure 12B:
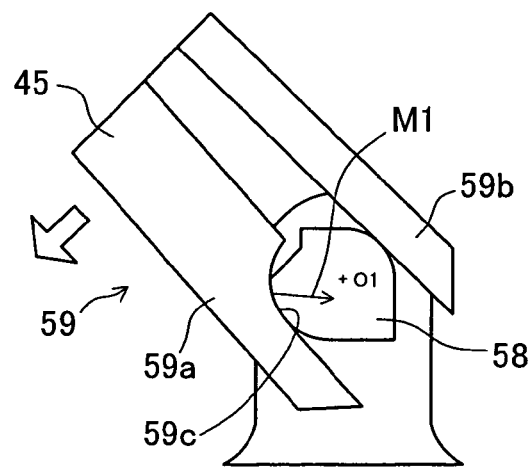
Figure 12C:
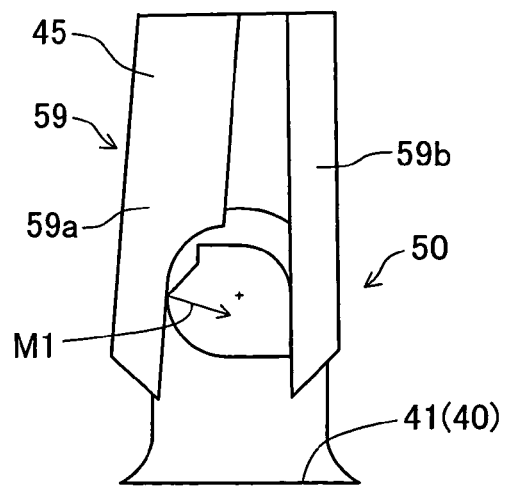

FIG. 12 illustrates the procedure for rotating the handle 45. The handle 45 is supported such that it can rotate within a 90° range by means of the axial support mechanism 50, that is, upraised from the retracted position pressed against the upper wall 41 of the cover 40 as shown in FIG. 12(A) to the position shown in FIG. 12(B), and finally to the upraised handling position shown in FIG. 12(C). When the handle 45 is not in the retracted position it is urged towards the retracted position (in the direction indicated by the arrow in FIG. 12(B)) by means of the urging mechanism 57. That is, when the handle 45 is positioned at an angle between the retracted position and the handling position, the resilient cam support piece 59a pushes under spring force against the arcuate face 58b of the cam 58, whereby the resilient cam support piece 59a exerts pushing force towards center O2. Since this pushing force is eccentric with respect to center axis O1 (which is the center of rotation of the handle 45), counterclockwise moment M1 is created. This moment M1 translates to force rotating the handle 45 about center axis O1. The handle 45 is thereby urged in the counterclockwise direction towards the retracted position from any position between the handling position and retracted position.

(2)-6 Clutch Mechanism 60

Figure 13:
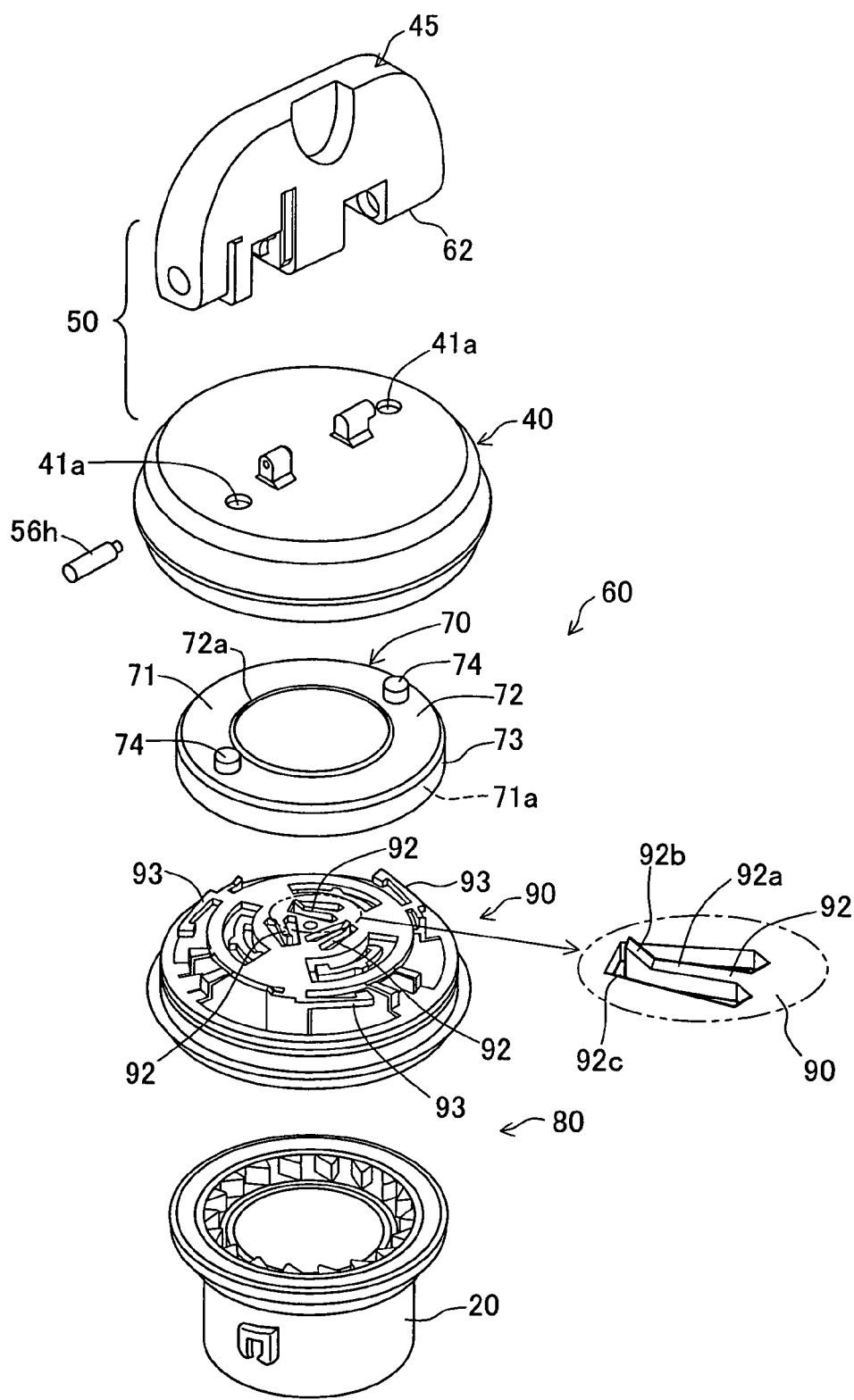
FIG. 13 is a perspective view showing the fuel cap disassembled.
Figure 14:
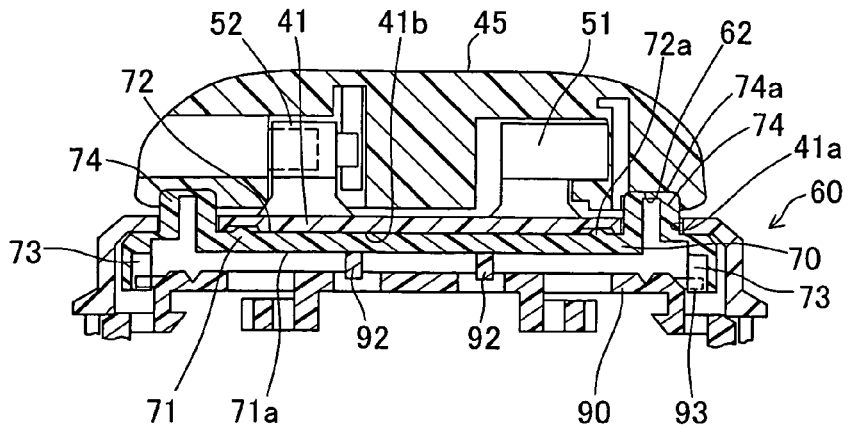
FIG. 14 is an illustrative diagram illustrating the clutch mechanism in non-interconnected mode.
Figure 15:
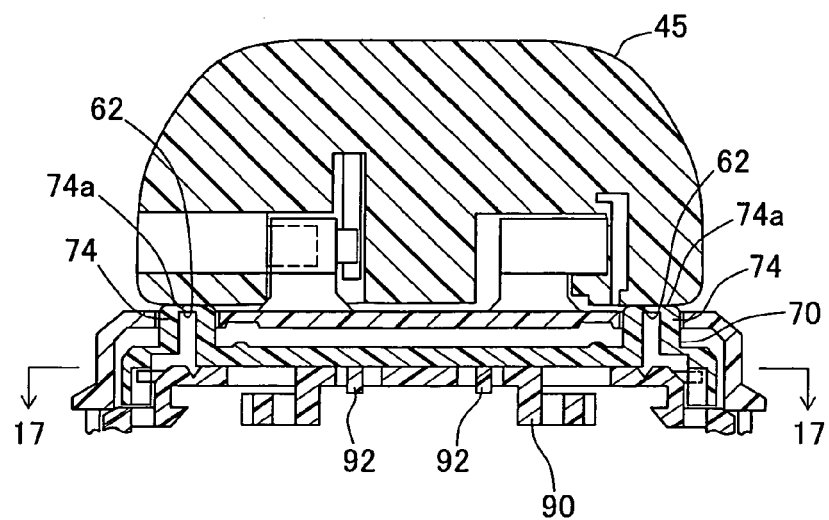
FIG. 15 is an illustrative diagram illustrating the clutch mechanism in interconnected mode.

FIG. 13 is a perspective view showing the fuel cap 10 disassembled, FIG. 14 is an illustrative diagram illustrating the clutch mechanism 60 in non-interconnected mode, and FIG. 15 is an illustrative diagram illustrating the clutch mechanism 60 in interconnected mode. The clutch mechanism 60 is a mechanism for transmission/non-transmission to the torque transmission mechanism 80 of rotational torque applied to the handle 45, and comprises a clutch member 70, a clutch spring 92 and the clutch arm 93 formed on the torque portion 90, and a cam face 62 formed on the lower face at both sides of the handle 45.

(2)-6-1 Clutch Member 70

In FIG. 13, the clutch member 70 is integrally molded by injection molding and comprises a clutch body 71. The clutch body 71 comprises an upper wall 72 of circular disk shape and a side wall extending downwardly from the outside edge of 72 so that the space surrounded by the upper wall 72 and the side wall 73 forms a storage recess 71a (see FIG. 14).

The upper wall 72 has an annular projection 72a projecting therefrom. As shown in FIG. 14 this annular projection 72a prevents the two from becoming wedged together so as to facilitate vertical motion of the clutch member 70. The upper wall 72 shown in FIG. 13 has buttons 74, 74 projecting therefrom at locations 180° apart with respect to the center of the clutch member 70. The buttons 74, 74 are retractably positioned in through-holes 41a formed in the cover 40.

(2)-6-2 Clutch Urging Mechanism 61

Three the clutch springs 92 are positioned at 120° intervals about the circumference on the upper face of the torque member 90. The clutch springs 92 impart spring force in the vertical direction relative to the clutch member 70. Each the clutch springs 92 comprises an arm 92a coplanar with the upper face of the torque member 90 and extending in the circumferential direction, and a pushing projection 92b projecting up from the upper face of the torque member 90 at the distal end of the arm 92a. The clutch springs 92 are of cantilever design, with one end thereof inclinable within a notch 92c in the upper face of the torque member 90, thereby urging the clutch member 70 upwardly.

Figure 16:
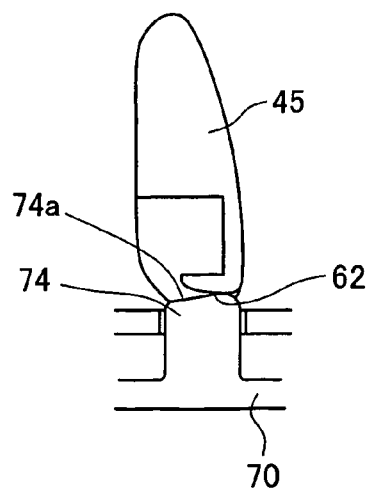
FIG. 16 is an illustrative diagram illustrating the relationship of the handle to the button of the clutch member.

FIG. 16 is an illustrative diagram illustrating the relationship of the handle 45 to the button 74 of the clutch member 70. The upper face of the button 74 is a sloped the pushing face 74a. A cam face 62 for pushing against the pushing face 74a is formed on the lower face of the handle 45 at both sides. The cam face 62 is designed so that with the handle 45 in the handling position, the button 74 of the clutch member 70 is pushed downwardly, and so that in the retracted position the button 74 s not pushed downwardly.

With this arrangement for the clutch urging mechanism 61, rotating the handle 45 from the retracted position shown in FIG. 14 to the handling position shown in FIG. 15 causes the cam face to push against the pushing faces 74a of buttons 74, 74, so that the clutch member 70 is pushed downwardly in opposition to the urging force of the clutch springs 92 and moves to the lower position, whereas in the retracted position, force ceases to be applied to buttons 74, 74 so that the clutch member 70 is returned to its original position by the clutch springs 92.

(2)-6-3 First Clutch Unit 63

Figure 17:
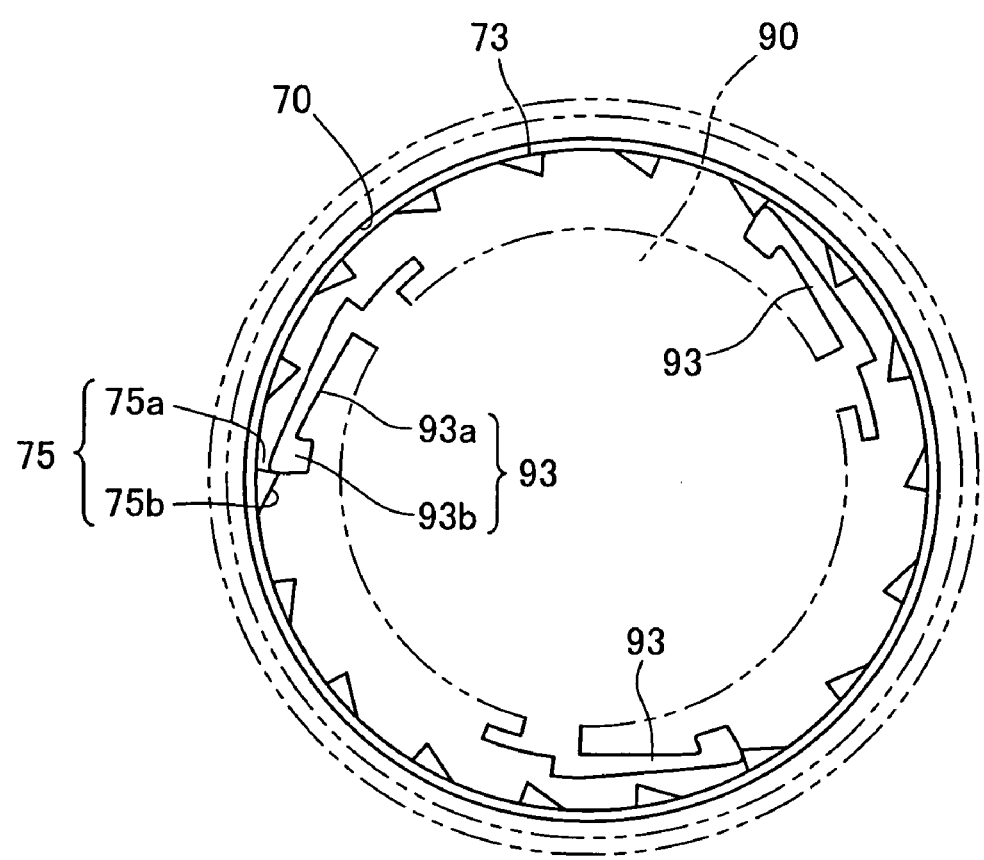
FIG. 17 is a sectional view taken in the vicinity line 17—17 in FIG. 15.

FIG. 17 is a sectional view taken in the vicinity line 17—17 in FIG. 15, and FIG. 18 illustrates operation of the first clutch unit 63. The first clutch unit 63 is a mechanism for transmitting rotational torque applied to the handle 45 in the closing direction, regardless of whether the handle is in the handling position or retracted position.

The first clutch teeth 75 are formed all the way around the inside rim of the side wall 73 of the clutch member 70. The first clutch teeth 75 comprise a right-angled the interlocking face 75a extending in the radial direction and a sloping face 75b inclined a predetermined angle with respect to the interlocking face 75a; the teeth are substantially right triangular in shape when viewed in cross section.

On the outside rim of the torque member 90 there are provided clutch arms 93 for interlocking with interlocking faces 75a. The clutch arms 93 are positioned at 120° intervals about the circumference on the upper outside rim of the torque member 90. Each the clutch arm 93 comprises an arm 93a extending along the circumferential direction, and a interlocking end 93b provided at the distal end of the arm 93a. The interlocking end 93b is formed by a surface in the radial direction so as to interlock with a interlocking face 75a. The interlocking face 75a is thicker than the interlocking end 93b so as to normally maintain the interlocked state regardless of whether positioned above (FIG. 18(A)) or below (FIG. 18(B)) the torque member 90 of the clutch member 70.

As shown in FIGS. 81(A) and (B), when the clutch member 70 is rotated in the clockwise direction, the interlocking end 93b interlocks with the interlocking face 75a, creating a torque transmission state in which the torque member 90 rotates in unison therewith in the clockwise direction. This torque transmission state is maintained regardless of whether the handle 45 is in the handling position of FIG. 18(A) or the handling position of FIG. 18(B), since in either state the interlocking face 75a of the clutch member 70 is in abutment with the interlocking end 93b.

Figure 18A:
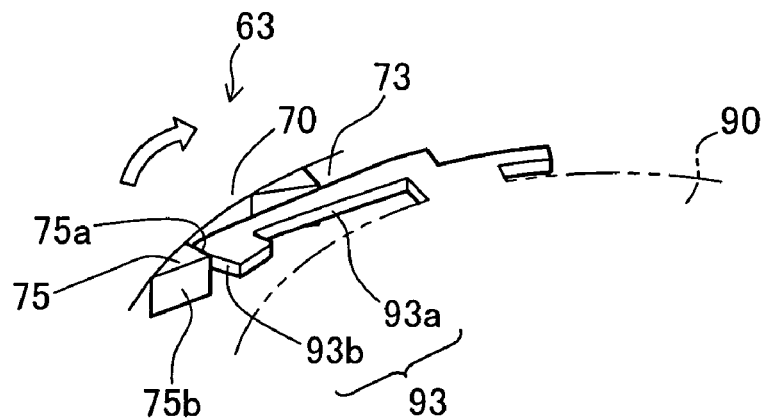
FIGS. 18A, 18B and 18C are illustrative diagrams illustrating operation of the first clutch unit.
Figure 18B:
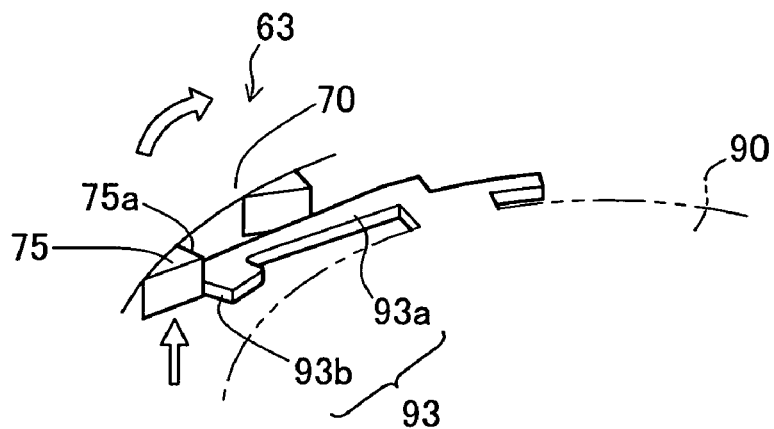
Figure 18C:
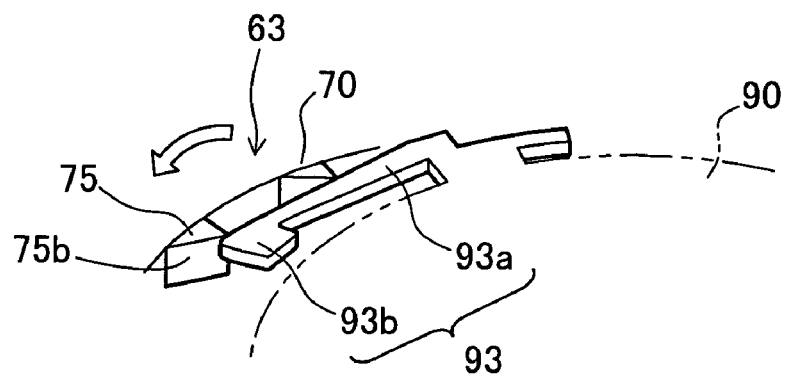

On the other hand when the clutch member 70 is rotated in the counterclockwise direction as illustrated in FIG. 18(C), there results a non-interconnected mode in which the sloping face 75b of the first clutch teeth 75 follows along the outside face of the arm 93a so that the torque member 90 does not rotate. In this way the first clutch teeth 75 and clutch arms 93 constitute a one-way clutch mechanism which normally interlocks in the clockwise direction (closing direction) to transmit rotational torque, and which does not transmit rotational torque in the counterclockwise direction (opening direction).

(2)-6-4 Second Clutch Unit 65

Figure 19:
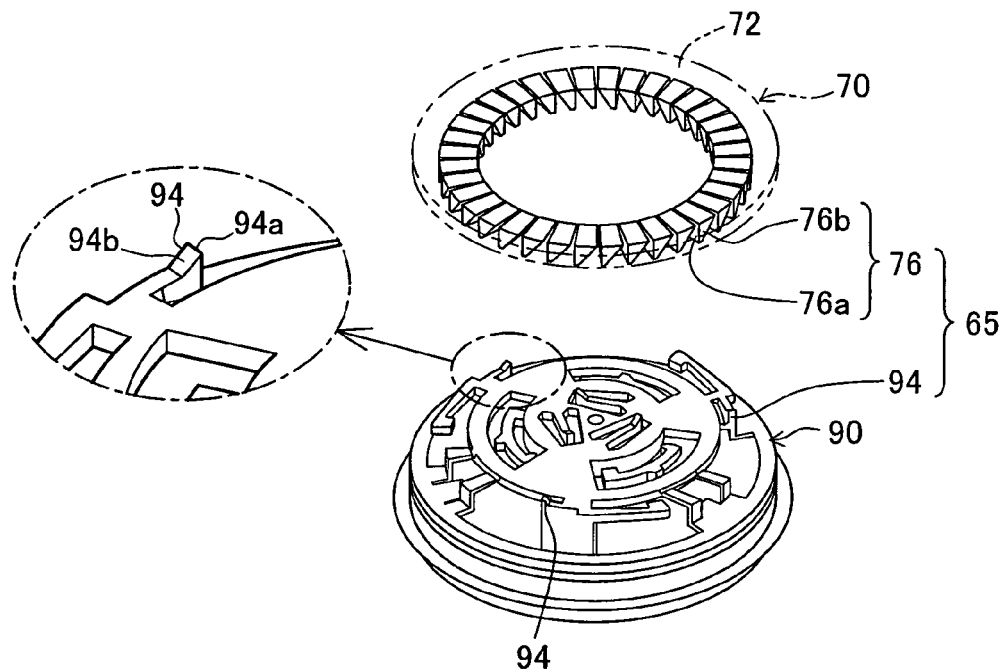
FIG. 19 is an illustrative diagram illustrating the second clutch unit.

FIG. 19 is an illustrative diagram illustrating the second clutch unit 65. The second clutch unit 65 is a mechanism for transmitting rotational torque applied in the opening direction to the handle 45, only when the handle is in the handling position.

The second clutch teeth 76 are formed all the way around the bottom outside rim of the upper wall 72 of the clutch member 70. Each the second clutch teeth 76 comprises a substantially vertical the interlocking face 76a and a sloping face 76b inclined by a predetermined angle with respect to the interlocking face 76a, to produce a substantially right triangular cross section.

On the upper face of the torque member 90 are formed second clutch interlocking portions 94 for interlocking with the second clutch teeth 76. The second clutch interlocking portions 94 are positioned at 120° intervals about the circumference in the upper portion of the torque member 90. Each the second clutch interlocking portion 94 comprises a vertical interlocking face 94a interlocking with a interlocking face 76a, and a sloping face 94b abutting a sloping face 76b.

Figure 20A:
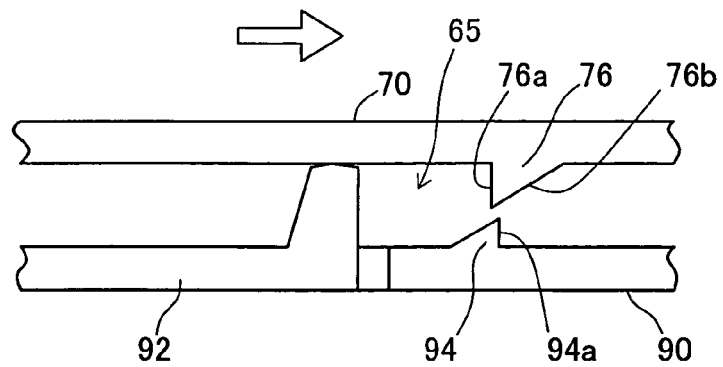
FIGS. 20A and 20B are illustrative diagrams illustrating operation of the second clutch unit.

FIG. 20 illustrates operation of the second clutch unit 65. As shown in FIG. 20(A), when the clutch member 70 is positioned upwardly by the spring force of the clutch spring 92 of the clutch mechanism 60, the interlocking faces 76a of the clutch member 70 are not interlocked with the interlocking faces 94a of clutch interlocking portions 94. Therefore the torque member 90 does not rotate even if the clutch member 70 is rotated.

Figure 20B:
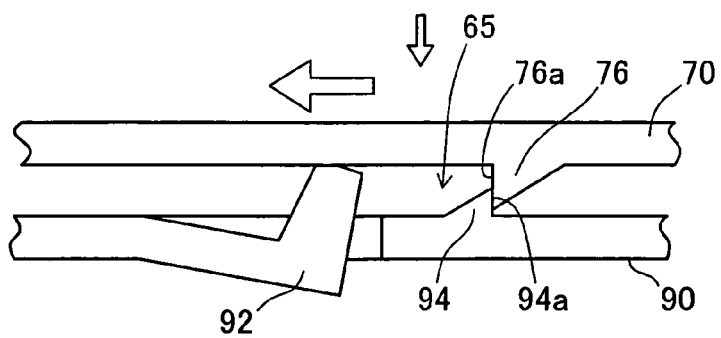

As shown in FIG. 20(B), when the clutch member 70 is positioned downwardly in opposition to the spring force of the clutch spring 92 of the clutch mechanism 60, the interlocking faces 76a of the clutch member 70 interlock with the interlocking faces 94a of clutch interlocking portions 94. Turning the clutch member 70 is the counterclockwise direction (opening direction) causes the torque member 90 to rotate in unison therewith in the same direction. In this way, the second clutch teeth 76 and second clutch interlocking portions 94 constitute a one-way clutch mechanism that transmits rotational torque only when the torque member 90 is in the down position, while not transmitting rotational torque in the clockwise direction.

(2)-7 Structure of the Torque Member 90

Figure 21:
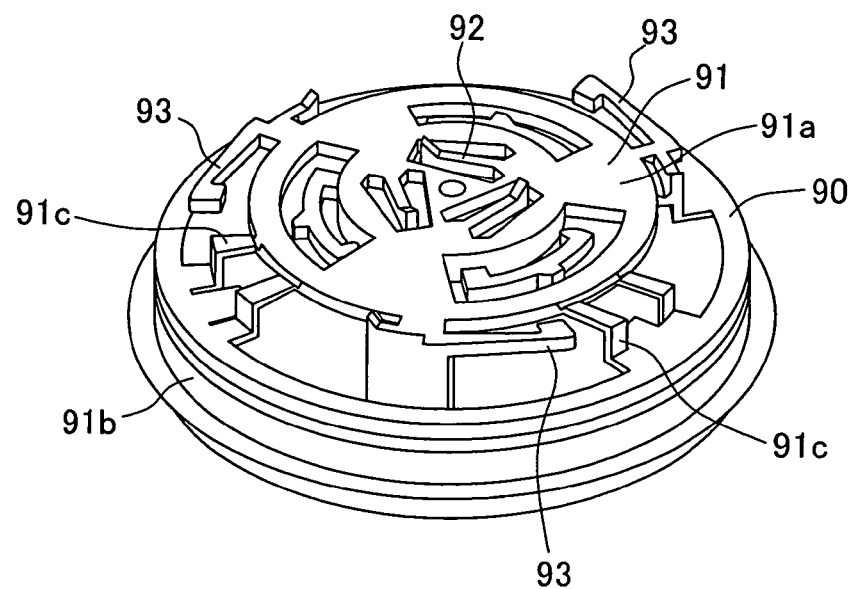
FIG. 21 is a perspective view showing the torque member.

FIG. 21 is a perspective view showing the torque member 90. The torque member 90 comprises a two-stage disk of resin having a projecting portion and interlocking portion in its center. That is, the torque member 90 comprises a torque plate body 91. The torque plate body 91 comprises an upper disk 91a, an annular portion 91b situated at the outside bottom of the upper disk 91a, and connector portions 91c connected at three locations to the annular portion 91b. The upper disk 91a comprises a clutch spring 92 which carries the clutch mechanism 60 described earlier, and is provided on its outside edge with clutch arms 93.

(2)-7-1 Torque Member 90 Mounting Structure

Figure 22:
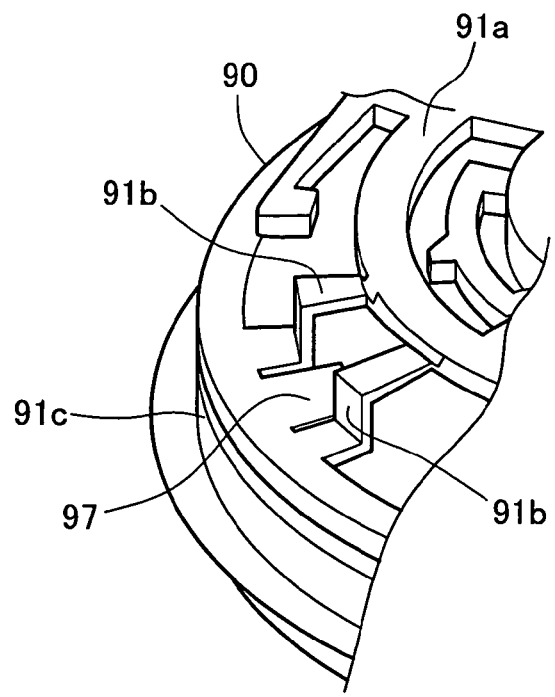
FIG. 22 is a perspective view showing principal elements of the torque member enlarged.
Figure 23:
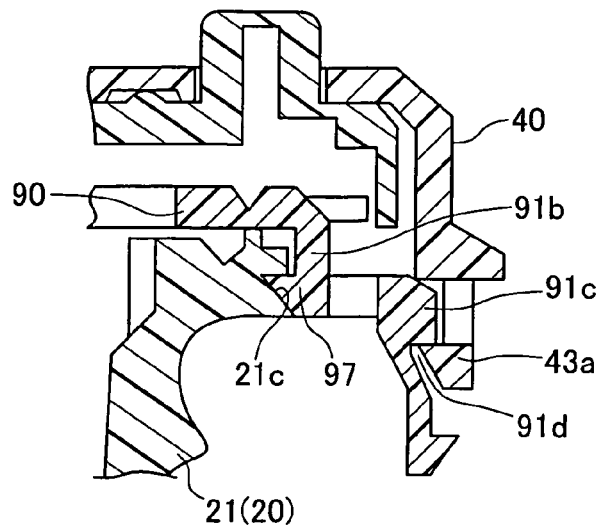
FIG. 23 is a sectional view of the area around the top of the casing body.

As shown in FIG. 22, the interlocking claws 97 are formed on the inside rim of the annular portion 91b of the torque member 90. The interlocking claws 97 are configured as tongue pieces extending towards the center of the torque member 90 and are resiliently deformable in the axial direction. FIG. 23 is a sectional view of the area around the top of the casing body 20. An interlocking recess 21c is formed around the upper outside rim of the outer tube 21 of the casing body 20. The interlocking claws 97 are forced into the interlocking recess 21c to rotatably mount the torque member 90 on the upper outside rim of the casing body 20.

An interlocking recess 91d is formed around the outside rim of the annular portion 91b, allowing the cover 40 of the torque member 90 to be rotatably supported within the interlocking recess 91d by detaining therein the support projection 43a on the inside wall of the side wall 43 of the cover 40 (see FIG. 1).

(2)-7-2 Structure of the Torque Transmission Mechanism 80

The torque transmission mechanism 80 shown in FIG. 1 is a mechanism that enables confirmation that the fuel cap 10 has been attached to the filler neck FN at a predetermined level of rotational torque, by providing the user with a tactile warning if excessive rotational torque above a predetermined level is applied to the handle 45 during the operation of closing the filler opening FNb with the fuel cap 10.

Figure 24:
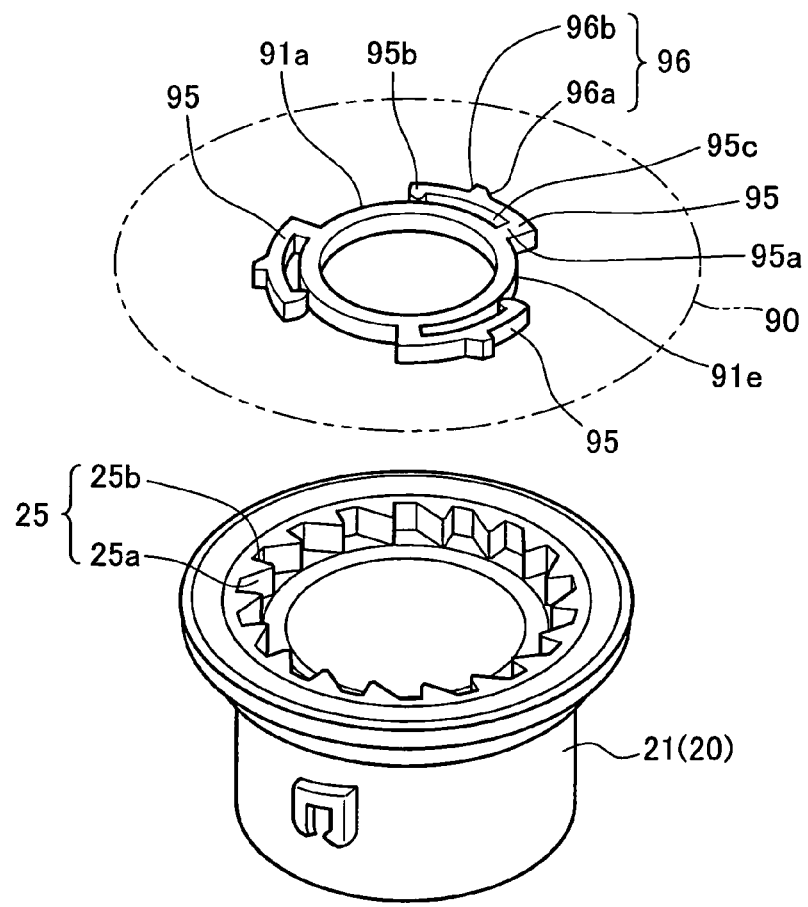
FIG. 24 is a perspective view showing the torque transmission mechanism.
Figure 25:
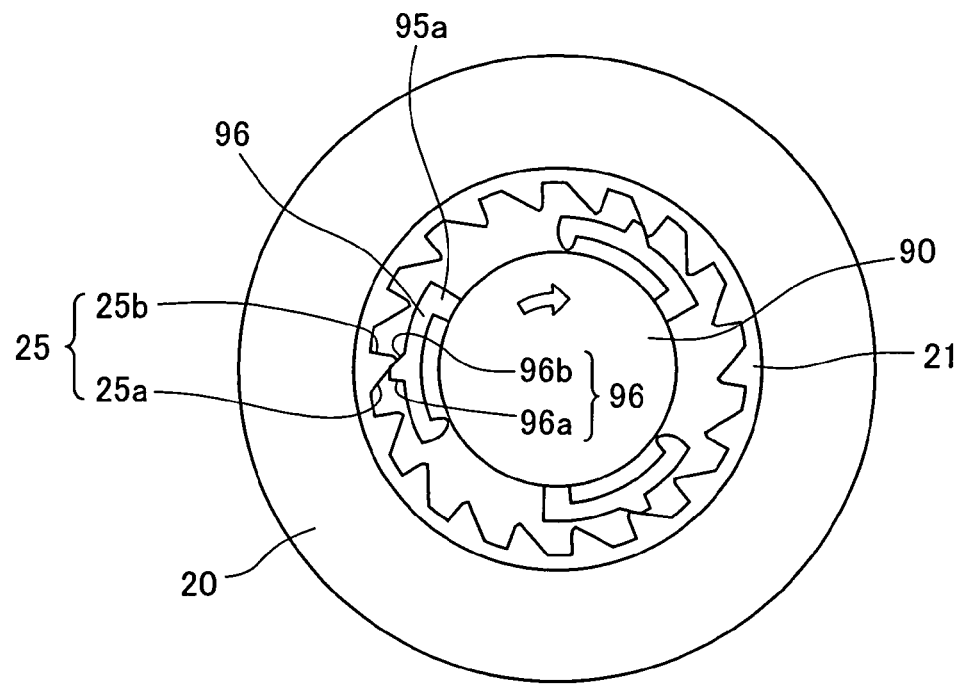
FIG. 25 is a plan view showing the torque transmission mechanism.

FIG. 24 is a perspective view showing the torque transmission mechanism 80, and FIG. 25 is a plan view showing the torque transmission mechanism 80. The upper inside rim of the outer tube 21 has formed thereon a body interlocking portion 25 constituting part of the torque transmission mechanism 80, described later. The body interlocking portion 25 extends around the entire inside circumference of the outer tube 21 and has a peak configuration composed of a first interlocking face 25a slanted substantially in the circumferential direction and a second interlocking face extending substantially in the radial direction.

Figure 26:
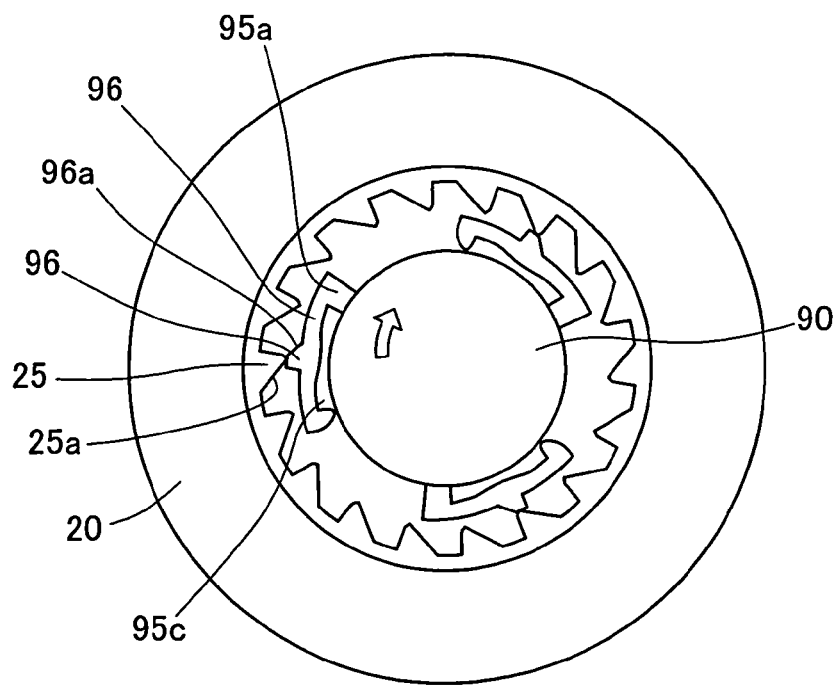
FIG. 26 is an illustrative diagram illustrating operation carrying over from FIG. 25.

An inner annular portion 91e of hollow cylindrical configuration is formed in the bottom of the upper disk 91a of the torque member 90, and three the resilient torque pieces 95 are formed at 120° intervals about the circumference on the outside edge of the inner annular portion 91e. As shown in FIG. 25, the resilient torque pieces 95 take the form of arched cantilever pieces having their support points at the supporting terminal portions 95a, and having the torque piece interlocking portions 96 projecting from their outside edges, with the spaces 95c to the inside of the torque piece interlocking portions 96. Each the torque piece interlocking portion 96 has a first interlocking face 96a formed on a first face thereof and a second interlocking face 96b formed on a second face. First interlocking face 96a is configured so as to come into abutment at a vertical face thereof with a first interlocking face 25a of the body interlocking portion 25 with clockwise rotation of the torque member 90; when pushed in the radial direction from the center by a body interlocking portion 25 the torque piece interlocking portions 96 undergoes resilient deformation so as to the constrict space 95c, as shown in FIG. 26.

(2)-7-3 Torque Member 90 Breaking Mechanism

Figure 28A:
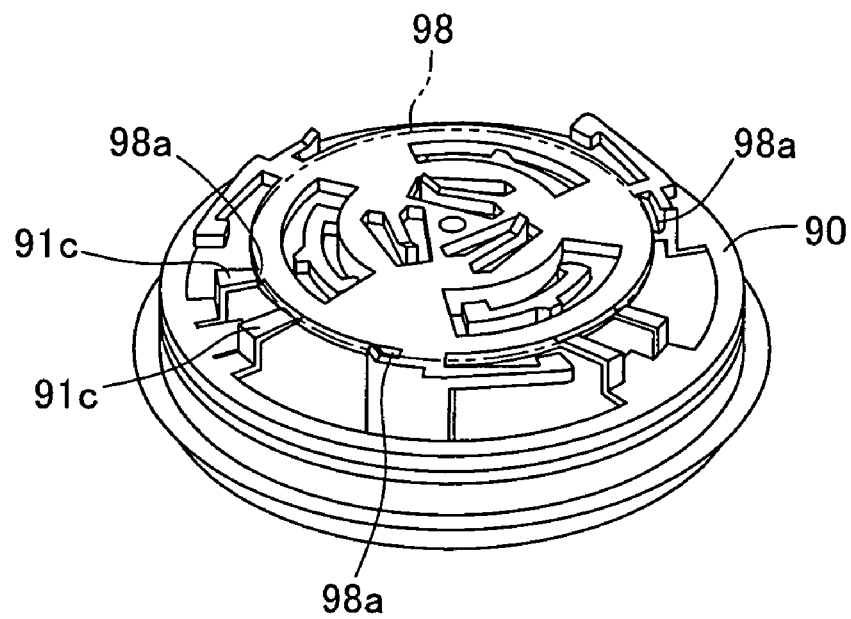
FIGS. 28A and 28B are illustrative diagrams illustrating frangible portion of the torque portion.

As shown in FIG. 28(A), the frangible grooves 98a constituting part of the frangible portions 98 are formed along the outside edge of the upper disk 91a of the torque member 90, between it and the connector portion 91c. The frangible grooves 98a are located at three areas in the circumferential direction, these the frangible grooves 98a being provided along the circumference of a circle connecting the cutout portions between connector portions 91c in the circumferential direction.

Figure 28B:
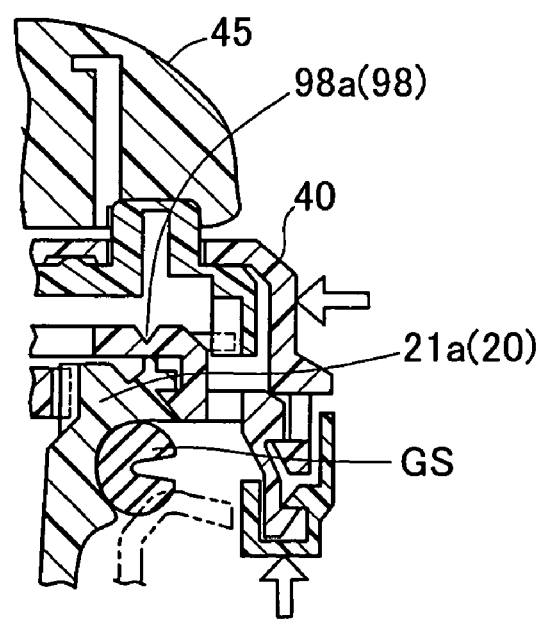

Referring now to FIG. 28(B), if the cover 40 or the handle 45 should be subjected to a strong external force such as that produced in an automobile collision, the frangible portions 98 supporting the cover 40 will separate at the outside edges thereof or the interlocking claws 97 will detach from the interlocking recess 21c beginning at the frangible portions 98. At this time the seal retaining portion 21a of the casing body 20 supporting the gasket GS is not damaged so that the seal is not lost. An additional reason for providing the torque member 90 with the frangible portions 98 is that by forming the frangible portions 98 in the upper portion of the casing body 20 there are no limitations as to the shape of the seal retaining portion 21a, making it a simple matter to optimize breaking load for external forces in various directions.

(2)-8 Tether Mechanism 100

Figure 29:
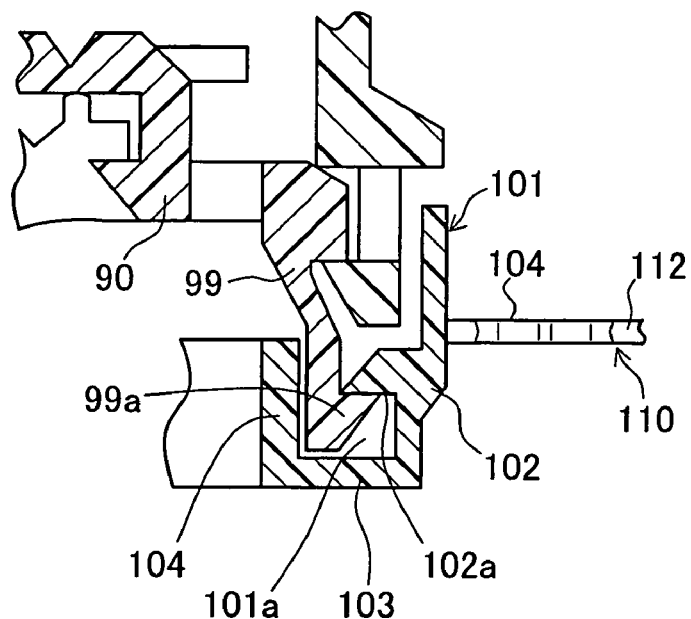
FIG. 29 is a sectional view of the area around the tether mechanism.
Figure 30:
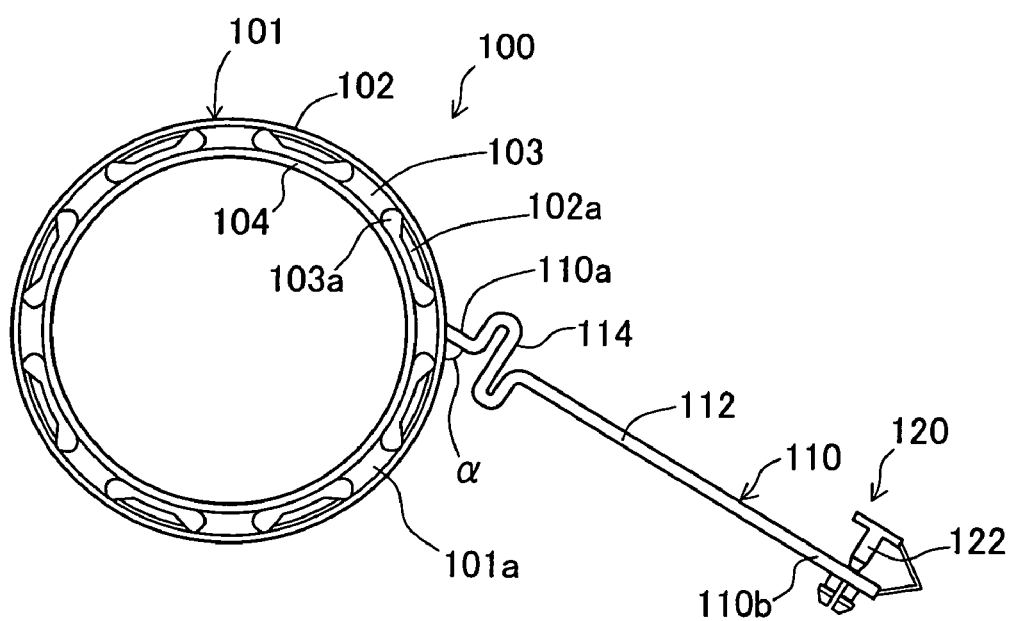
FIG. 30 is a plan view of the tether mechanism.
Figure 31:
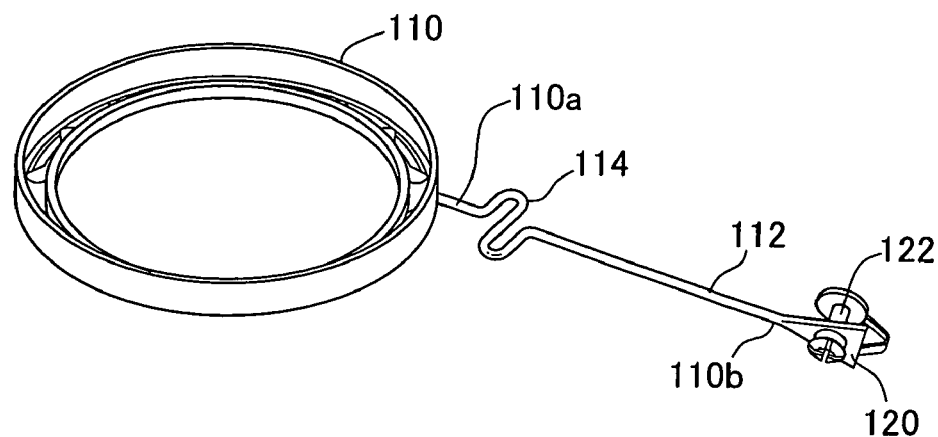
FIG. 31 is a perspective view illustrating the tether mechanism.

FIG. 29 is a sectional view of the area around the tether mechanism 100, FIG. 30 is a plan view of the tether mechanism 100, and FIG. 31 is a perspective view illustrating the tether mechanism 100. The tether mechanism 100 is designed to prevent the fuel cap 10 from falling off or becoming lost during fueling, and comprises a tether rotation support 101, a connector member 110, and a support end 120. As shown in FIG. 29, the tether rotation support 101 is rotatably supported on one end of a support wall 99 of the torque member 90. Specifically, the tether rotation support 101 has an annular configuration extending all the way around the support wall 99 and has an open square cross section defined by an outer the annular outer wall 102, the floor 103 and annular the inner wall 104, with an annular recess 101a therebetween. The outer the annular outer wall 102 is taller than annular the inner wall 104. The interlocking projections 102a project from the inside face of the annular outer wall 102. As shown in FIG. 30, the interlocking projections 102a are situated at six locations equal distances apart along the circumference, and when the interlocking claws 99a of the support wall 99 are snapped into the annular recess 101a these interlock with the interlocking projections 102a as shown in FIG. 29 so that the tether rotation support 101 is rotatably supported on the torque member 90.

The tether mechanism 100 is integrally molded by injection molding of thermoplastic elastomer (TPEE) or thermoplastic resin (e.g. PP). As shown in FIG. 30 a first end of the connector member 110 is connected to the tether rotation support 101, inclined with respect thereto by a predetermined angle α (5°–180°). The connector member 110 comprises a connector member body 112 and a flex portion 114. The flex portion 114 is located in proximity to a first connecting end 110a at one end of the connector member 110. Flex portion 114 is composed of inverted "U" shapes connected together in a substantially "S" configuration and is coplanar with the tether rotation support 101 so that when subjected to force in the direction indicated by arrow d1 in FIG. 32 the connector member body 112 will bend along the outside perimeter of the cover 40.

Figure 34:
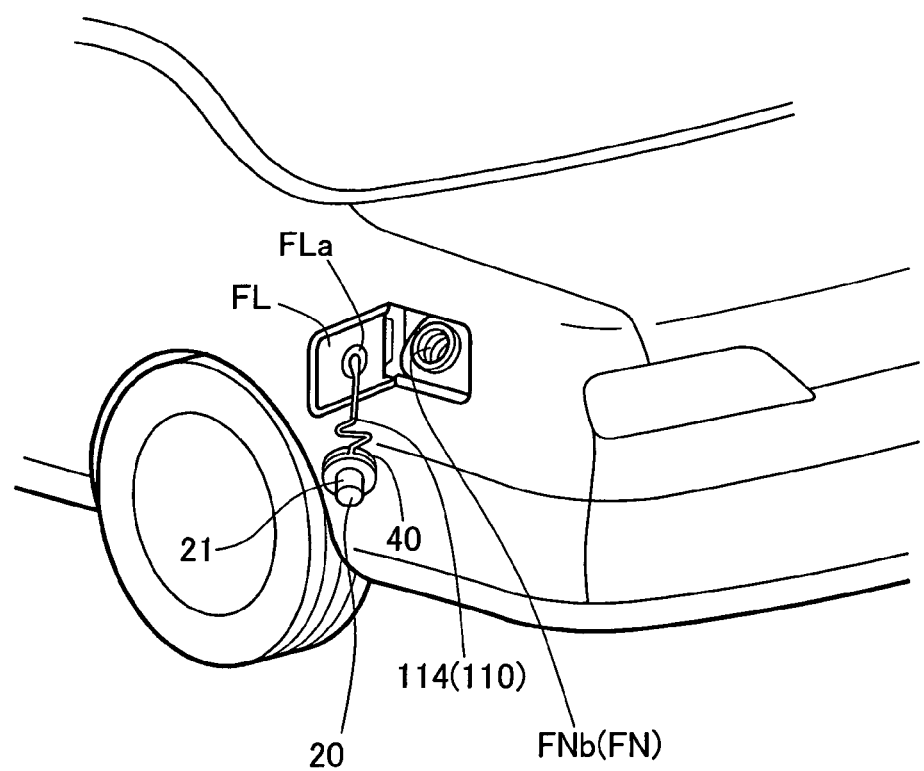
FIG. 34 is a perspective view showing the rear end of a vehicle being fueled with the fuel cap detached from the filler neck.

In FIG. 31 a support end 120 is formed at a second connecting end 110b at the other end of the connector member 110. The support end 120 is of tabular configuration fanning out towards the distal end and is formed by twisting at a right angle, i.e. 90°, with respect to the connector member 110. A detent projection 122 projects from the support end 120. As shown in FIG. 34, the detent projection 122 is rotatably supported on a support portion formed on the back face of the fuel cover FL. When fuel cover FL is opened away from the filler neck FN the fuel cap 10 is suspended via the connector member 110 fixed to the support end 120. When at this point the fuel cap 10 is released the cover 40 of the fuel cap 10 drops toward the exterior panel of the vehicle, suspended away from the vehicle panel due to the 90° bend with respect to the connector member 110, enabling the fueling operation. That is, the fuel cap is located away from the vehicle panel during fueling and therefore does not interfere with the fuel nozzle and preventing fuel on the casing body 20 from dripping onto the vehicle panel.

Figure 32:
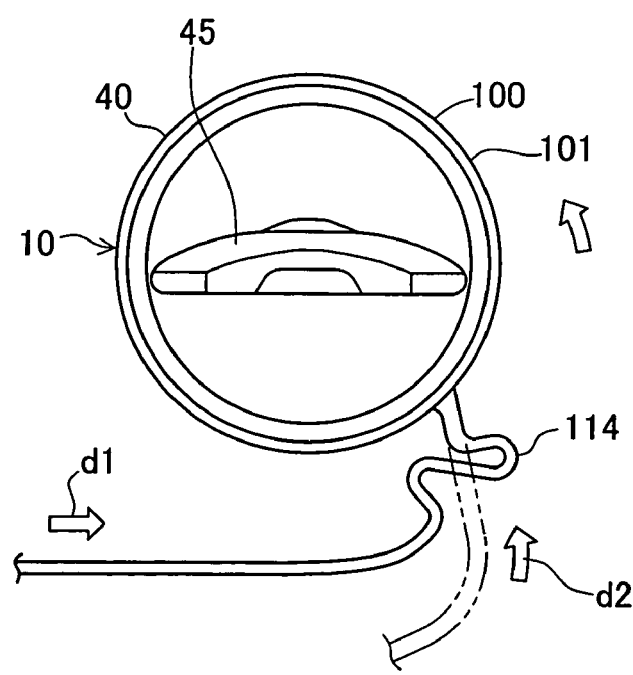
FIG. 32 is a perspective view illustrating operation of the tether mechanism.

With the fuel cap 10 removed, the fuel cap 10 is then replaced in the filler opening FNb of the filler neck FN and the handle 45 turned in the closing direction shown in FIG. 32; as the tether rotation support 101 is rotatable with respect to the torque member 90 (FIG. 29), and as the connector member 110 is not subjected to any appreciable force from the fuel cover FL or the fuel cap 10 so as to remain slack on a substantially straight line, the opening/closing operation of the fuel cap 10 is not impaired. At this time the connector member 110 flexes at the flex portion 114 so that the connector member body 112 flexes along the outside perimeter of the cover 40.

Figure 33:
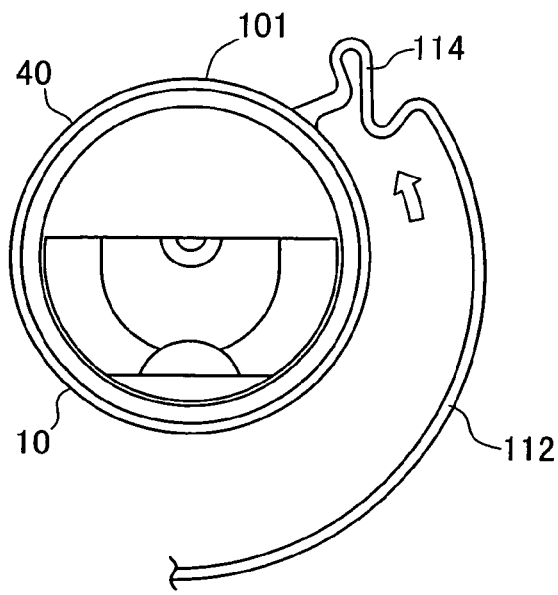
FIG. 33 is an illustrative diagram illustrating operation carrying over from FIG. 32.

When fuel cover FL (FIG. 34) is subsequently shut the connector member body 112 is pushed longitudinally from the position illustrated in FIG. 32 in association with the motion of fuel cover FL. Longitudinal force on the connector member body 112 is converted to force tending to rotate the tether rotation support 101 in the counterclockwise direction so that the tether rotation support 101 rotates smoothly causing the connector member body 112 to coil around the cover 40 as illustrated in FIG. 33. Since the connector member body 112 coils around the cover 40 in this way it can be accommodated within the space behind the fuel cover FL and does not hinder opening and closing of the fuel cover FL.

As shown in FIG. 29, the tether rotation support 101 of the tether mechanism 100 is supported by a torque member 90 of polyacetal having a smooth surface, enabling it to rotate smoothly about the outside rim of the torque member 90 so that the opening/closing operation of the fuel cap 10 is not impaired. The torque member 90 is moreover fabricated of highly swelling-resistant polyacetal and therefore experiences negligible change in shape that would increase outside diameter, so that the ability of the tether rotation support 101 to rotate is not diminished. Further, as the tether rotation support 101 is formed of pliable thermoplastic elastomer (TPEE) or thermoplastic resin (PP) bending thereof at the flex portion 114 can be assured.

(3) Fuel Cap 10 Assembly Procedure

To assemble the fuel cap 10, first, the handle 45 is attached to the cover 40 as shown in FIG. 9. The regulator valve 35 is also installed in the valve chamber 24 of the casing body 20 as shown in FIG. 1, and the flange 32 of the inner cover 30 is ultrasonically welded onto the upper portion of the valve chamber molding 22. Next, as shown in FIG. 23, the interlocking claws 97 of the torque member 90 are forced into the interlocking recess 21c of the casing body 20 to attach the torque member 90 to the casing body 20. The button 74 of the clutch member 70 is aligned with the through-hole 41a in the cover 40, attaching the clutch member 70 to the cover 40 and then interlocking the support projection 43a of the cover 40 with the interlocking recess 91d to attach the cover 40 onto the torque member 90. Then as shown in FIG. 29 the tether rotation support 101 of the tether mechanism 100 is forced over the interlocking claws 99a of the support wall 99 to attach the tether mechanism 100 to the torque member 90. This completes assembly of the fuel cap 10.

(4) Fuel Cap 10 Operation

Following is a description of the opening and closing operation when attaching or replacing the fuel cap 10 in the filler opening FNb of the filler neck FN.

(4)-1 Fuel Cap 10 Closing Operation

With the fuel cap 10 detached from filler opening FNb, the handle 45 is pulled upright with the fingers as shown in FIG. 14, whereupon the handle 45 rotates about axial support portions 51, 52 shown in FIG. 14, in opposition to the spring force of the urging mechanism 57 (see FIG. 10) and the clutch spring 92 (see FIG. 20). Rotation of the handle 45 causes the cam face 62 to push against the pushing face 74a of the button 74 of the clutch member 70. The clutch member 70 then moves downwardly in opposition to the urging force of the clutch spring 92 of the torque member 90 as shown in FIG. 15.

Next, as shown in FIG. 3 the casing interlocking portion 20a of the casing body 20 is aligned with the neck insertion notch FNd of the filler neck FN and inserted therein in the axial direction. Clockwise force is then applied to the handle 45 and is transmitted to the clutch member 70 via the cover 40, the cover 40 the through-hole 41a and the button 74 of the clutch member 70, causing the clutch member 70 to rotate. Since the interlocking faces 75a of the first clutch teeth 75 normally interlock with the interlocking ends 93b of clutch arms 93 of the torque member 90 as shown in FIG. 18(A), the torque member 90 rotates in tandem with rotation of the clutch member 70. It should be noted that even if the user does not move the handle 45 to the handling position, i.e., even with the handle in the retracted position, the interlocking ends 93b are interlocked with the interlocking faces 75a as shown in FIG. 18(B) so that rotational torque is transmitted from the clutch member 70 to the torque member 90.

As the torque member 90 rotates, the first interlocking faces 96a of the torque piece interlocking portions 96 of the torque member 90 press against first interlocking faces 25a of body interlocking portions 25 at the interlock locations illustrated in FIG. 25. This causes the handle 45, the cover 40, the clutch member 70, the torque member 90 and the casing body 20 to rotate in unison in the direction of closing the filler opening FNb, with the casing interlocking portions 20a (see FIG. 3) interlocking with opening interlocking portion FNc with increasing force. When reaction force created by this interlocking force exceeds a predetermined level of rotational torque, the torque piece interlocking portions 96 in the state shown in FIG. 26 now ride over the body interlocking portions 25.

At this point the first interlocking faces 96a of the torque piece interlocking portions 96 are forced in the radial direction by the reaction force from the first interlocking faces 25a, causing the resilient torque pieces 95 to resiliently deform so as to constrict the width of the spaces 95c, so that the torque piece interlocking portions 96 ride up over body interlocking portions 25. This provides to the user with a tactile warning of over-tightening. In this state the fuel cap 10 is attached to the filler opening FNb at a predetermined level of tightening torque.

When the handle 45 is subsequently released it is subjected to spring force created by the resilient cam support piece 59a pinching the cam face 58 (see FIG. 36) and to the spring force of the clutch spring 92 transmitted to handle via the button 74, and rotates about axial support portions 51, 52 to return to the retracted position.

(4)-2 Fuel Cap 10 Closed State

In the state shown in FIG. 1, the handle 45, the cover 40, and the clutch member 70 are not constrained in the opening direction (counterclockwise direction) by the torque member 90 and the casing body 20, and thus rotate freely. Thus, if the cover 40 and/or the handle 45 should be subjected to external force as in a collision, they will simply turn freely without rotational torque being transmitted to casing member 20 through the torque transmission mechanism 80, so that there is no loss of seal.

(4)-3 Procedure for Opening the Fuel Cap 10

The procedure for opening the fuel cap 10 is initiated by pulling up the handle 45 as shown in FIG. 15. This causes the cam face 62 in the lower center of the handle 45 to push against the pushing face 74a of the button 74 of the clutch member 70, so that the clutch member 70 moves downwardly. In this state, turning the handle 45 counterclockwise causes the interlocking faces 76a of the second clutch teeth 76 to interlock with the interlocking faces 94a of second clutch interlocking portions 94 as shown in FIG. 20(B), so that the torque member 90 rotates in the counterclockwise direction in tandem with rotation of the clutch member 70 in the same direction.

Figure 27:
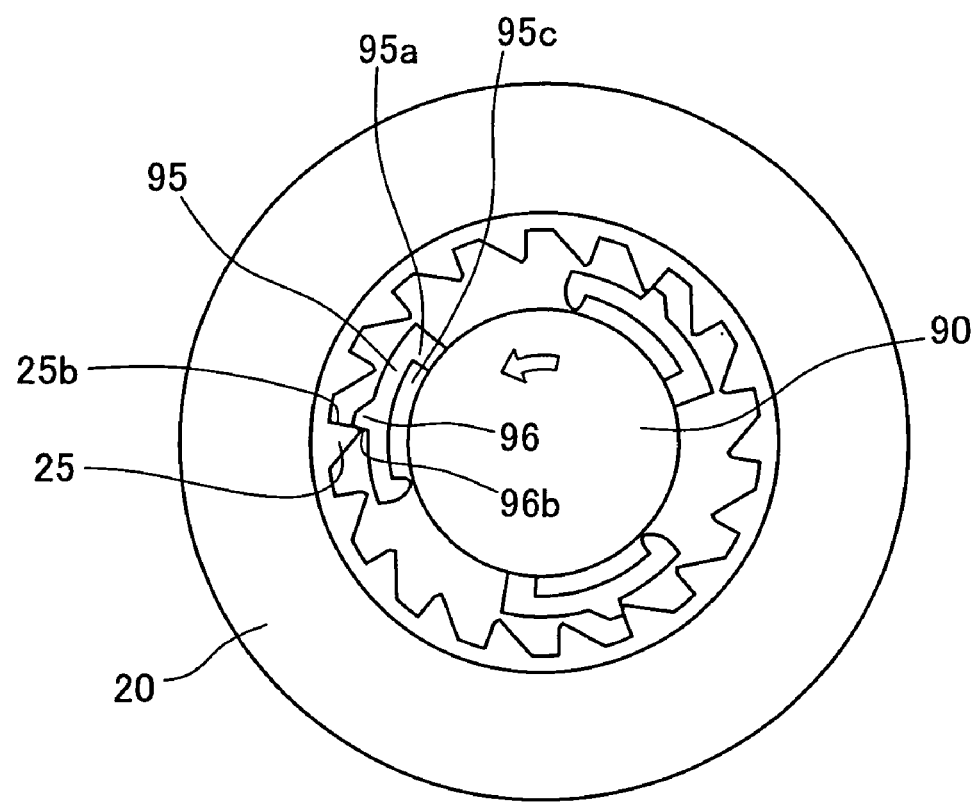
FIG. 27 is an illustrative diagram illustrating operation carrying over from FIG. 26.

In this state, the second interlocking faces 96b of the torque piece interlocking portions 96 interlock with the second interlocking faces 25b of body interlocking portions 25 as shown in FIG. 27. The second interlocking faces 96b and the second interlocking faces 25b come into abutment substantially in the radial direction and do not produce center-directed force tending to cause the resilient torque pieces 95 to constrict the spaces 95c, so that the torque piece interlocking portions 96 do not ride over body interlocking portions 25, but instead transmit rotational torque applied to the handle 45 to the casing body 20. As a result the handle 45, the cover 40, the clutch member 70, the torque member 90 and the casing body 20 rotate in unison in the clockwise direction.

The casing interlocking portion 20a then comes away from the opening interlocking portion FNc of the filler neck FN so that the casing body 20 is released from the constraining force of the filler neck FN. The fuel cap 10 can now be removed from the filler neck FN by pulling out in the axial direction.

(4)-4 Operation of the Handle 45 the Urging Mechanism 57

Figure 35A:
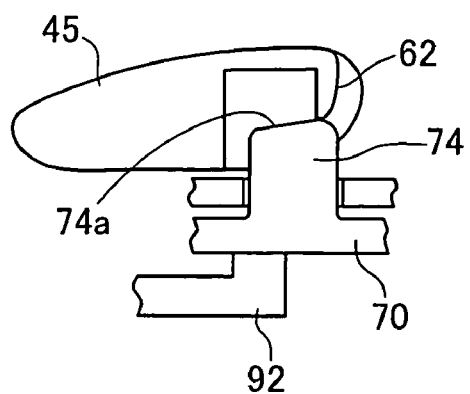
FIGS. 35A, 35B and 35C are illustrative diagrams illustrating operation of the handle.
Figure 35B:
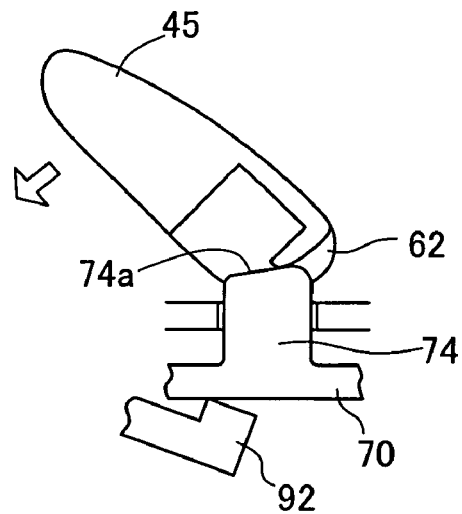
Figure 35C:
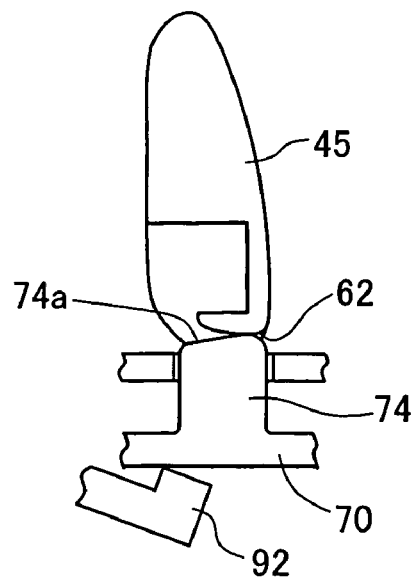
Figure 36A:
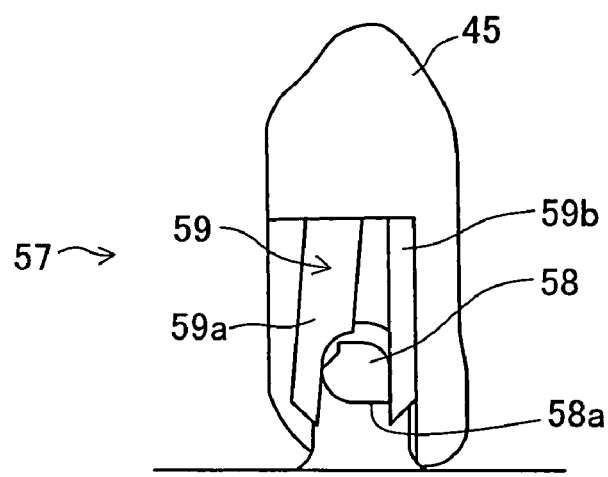
FIGS. 36A, 36B and 36C are illustrative diagrams illustrating operation of the handle.
Figure 36B:
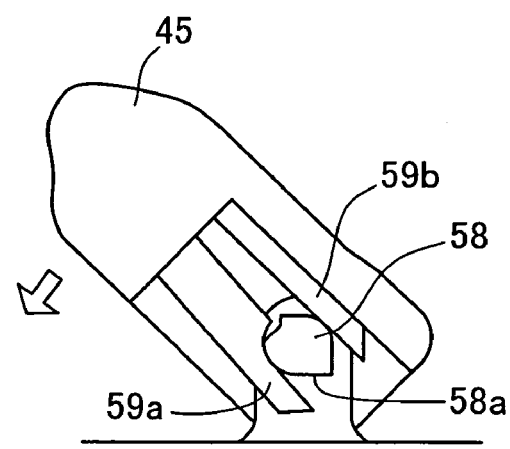
Figure 36C:
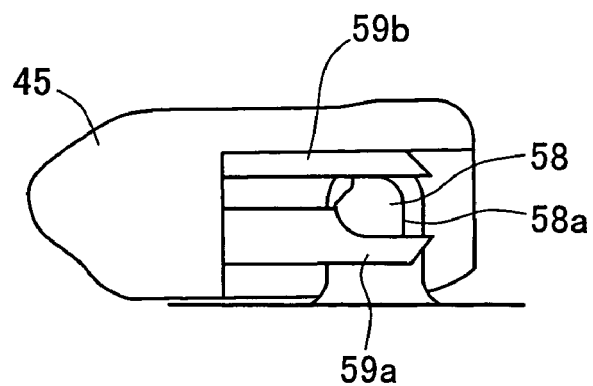

FIG. 35 illustrates the return operation of the handle 45 by the clutch spring 92, and FIG. 36 illustrates the return operation of operation of the handle 45 by the urging mechanism 57. When opening or closing the handle 45, the handle 45 is rotated from the retracted position to the handling position; this is done in opposition to rotational torque returning the handle 45 to the retracted position, due to spring force of the clutch spring 92 and the urging mechanism 57. Rotational torque is normally energized in the return direction is for the following reasons.

(1) As the vehicle is driven the handle 45 is kept flat on the cover so as to not project significantly thereabove, making it more difficult for the handle 45 to be subjected to external force.

(2) Chattering of the handle 45 is reduced so that strange noises are not produced during driving.

The reason for using two resin springs as the urging mechanism 57 and the clutch spring 92 to produce rotational torque in the return direction is as follows.

Figure 37:
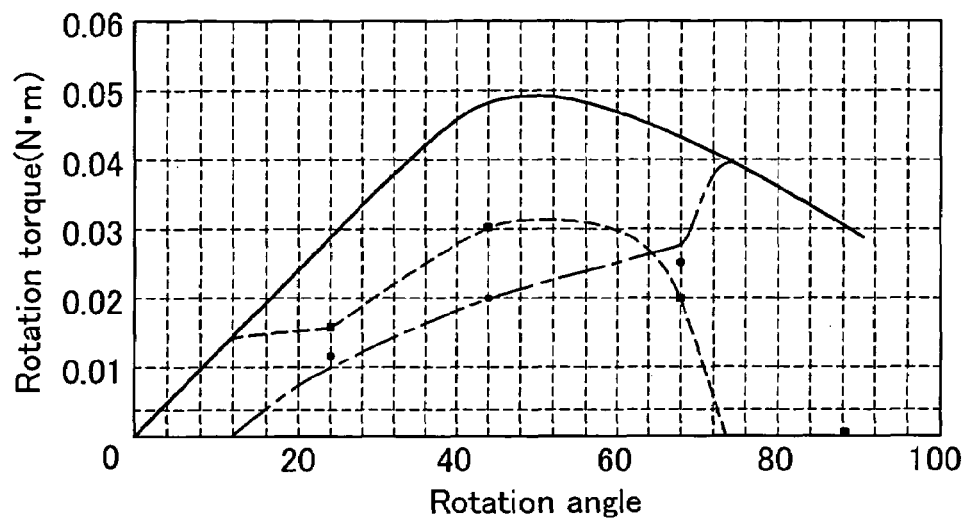
FIG. 37 is a graph illustrating the relationship of angle of rotation to rotational torque applied to handle.
Figure 38:
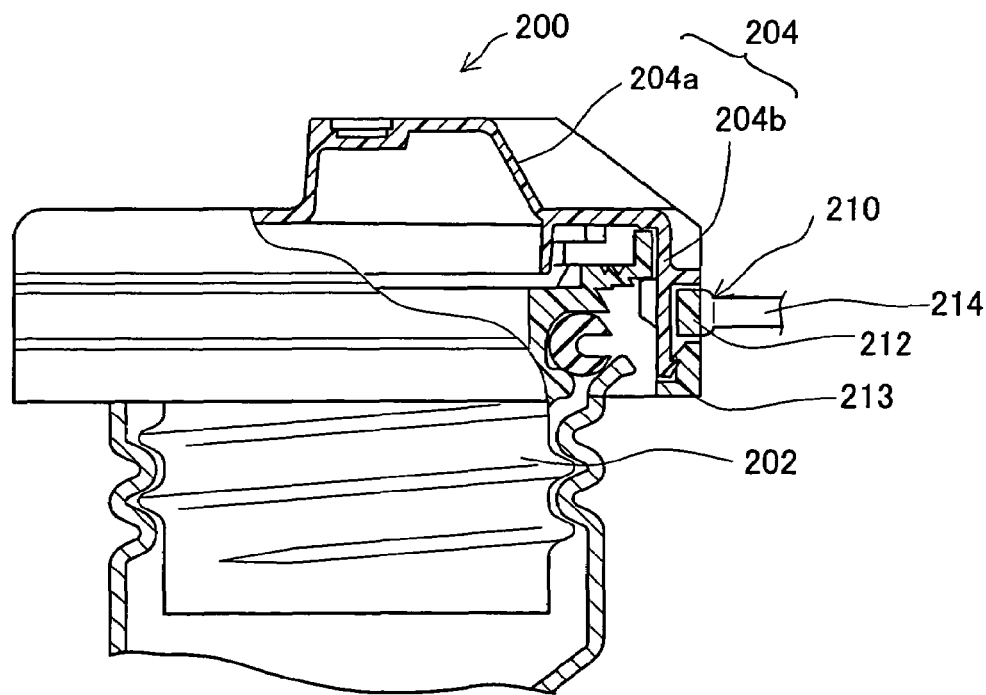
FIG. 38 is a sectional view showing a cap device

FIG. 37 is a graph illustrating the relationship of angle of rotation to rotational torque applied to the handle. In FIG. 37, rotational torque produced by the urging mechanism 57 is graphed by a broken line, rotational torque produced by the clutch spring 92 by a dotted and dashed line, and total rotational torque applied to the handle 45 by a solid line. As will be apparent from FIG. 37, the urging mechanism 57 is set to high rotational torque at small angles of less than 45°, while the clutch spring 92 is set to high rotational torque at large angles of from 45° to 90°.

Rotational torque levels are set in this way for the following reason. The spring force produced by the urging mechanism 57 depends on the shape of the cam face 58a of the cam 58, making it difficult to produce a shape for a cam that can generate a high level of rotational torque over a wide control range. For the clutch spring 92 to generate rotational torque over a wide control range it would be necessary for the torque member 90 to move with a large stroke. Further, where only a single resin spring is used to generate rotational torque over a wide control range it will be necessary for the resin spring to flex appreciably, which over a period of several years may lead to failure. By using instead two resin springs, it is possible to achieve rotational torque for stable return over a wide range of 0–90°.

(5) Working Effects of the Fuel Cap 10

In addition to the working effects described above, the fuel cap 10 affords the following working effects.

(5)-1 In the process of closing the fuel cap 10, tactile warning is provided when the torque piece interlocking portions 96 of the torque member 90 ride up over body interlocking portions 25 of the casing body 20 as shown in FIGS. 25 and 26, so that the user may determine that the fuel cap 10 has been tightened to a predetermined level of torque, thereby allowing the cap to be attached to a predetermined level of torque regardless of any resilience on the part of the gasket GS etc.

(5)-2 With the fuel cap 10 closing the filler opening FNb as shown in FIG. 1, the clutch member 70 does not move in tandem with the casing body 20 in the opening direction, due to the clutch mechanism 60, and thus even if the handle 45 should be subjected to force in the opening direction due to some unforeseen external force, it will simply turn freely with respect to the casing body 20. Therefore the casing body 20 will not be subjected to external force applied to the handle 45 and will remain seated in the filler opening FNb. The fuel cap 10 can therefore maintain a seal without becoming loosened by unforeseen external force.

(5)-3 With the fuel cap 10 attached to filler opening FNb as shown in FIG. 1, the handle 45 is placed in the retracted position by spring force and returns to this position from the upraised handling position during the opening/closing operation, and is therefore not susceptible to external force such as that occurring in a vehicle collision or the like, so that it is not subjected to force tending to loosen the fuel cap 10. Additionally, even where the handle 45 is of appreciable size, since it is positioned laying flat on the upper wall 41 of the cover 40 in the closed position, a minimal amount of space around the filler opening is required to accommodate it.

(5)-4 As shown in FIG. 24, the body interlocking portions 25 of the torque transmission mechanism 80 are formed at equal distances all the way around the inner cover 30, whereby rotational torque may be transmitted immediately to the casing body 20 without changing the position of the handle 45, and whereby uniform rotational torque may be transmitted regardless of the position of the torque piece interlocking portions 96.

(5)-5 With the fuel cap 10 in the closed state, the handle 45 turns freely in the opening direction whereby the user may turn the handle 45 to the desired position, improving ease of opening/closing.

(5)-6 As shown in FIG. 1, with the fuel cap 10 in the closed state the handle 45 can be visually confirmed to be lowered into the retracted position, and it will be readily understood that opening/closing can be accomplished by upraising it, thereby providing superior operation to the button operation arrangement described in the prior art.

(5)-7 As shown in FIG. 18, the first clutch unit 63 transmits rotational torque even when the handle 45 is not in the handling position, so that even if the user neglects to move the handle 45 to the handling position it is still possible to close the tank opening with the casing body 20. The first clutch unit 63 (FIG. 18) and the second clutch unit 65 (FIG. 20) turn freely in the opening direction when the handle 45 is in the retracted position, so that the casing body 20 will not be rotated by external force and will not lose seal.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cap device that is detachable to a tank opening, the cap device comprising:

a closer that closes the tank opening; a handle mechanism that is operable to open and close the tank opening;

a disk-shaped torque member that is rotatably mounted on the closer, the torque member being configured to transmit rotational torque applied to the handle mechanism in a opening and closing direction to the closer; and a plate attachment mechanism that rotatably attaches the torque member to the closer, wherein the plate attachment mechanism is configured such that the torque member is mounted to engage with an upper portion of the closer in an axial direction of the closer, and part of the torque member is elastically deformed by an external force applied to the handle mechanism, thereby detaching the torque member from the closer.

2. The cap device in accordance with claim 1, wherein the plate attachment mechanism includes a first engagement element disposed on a circumference of the torque member to be elastically deformable, and a second engagement element disposed on a circumference of the closer, the second engagement element being configured to engage with the first engagement element.

3. The cap device in accordance with claim 2, wherein the first engagement element includes interlocking claws arranged along an inside rim of the torque member, and the second engagement element includes an interlocking recess formed around an upper outside rim of the closer, the interlocking claws being elastically deformed to be fitted in the interlocking recess, so as to rotatably support the torque member on the closer.

4. The cap device in accordance with claim 1, further comprising a handle attachment mechanism, the handle attachment mechanism being configured to rotatably support the handle mechanism on a circumference of the torque member.

5. The cap device in accordance with claim 4, wherein the handle mechanism includes a handle, and a cover joined with the handle and defining an upper circumference of the torque member, and the handle attachment mechanism includes a cover engagement element formed on an inner wall of the cover and a torque member engagement element formed on the torque member to engage with the cover engagement element.

6. The cap device in accordance with claim 5, wherein the cover engagement element has support projections formed on an inside wall of the cover, and the torque member engagement element has an interlocking recess formed around an outside rim of the torque member, the interlocking recess being configured to engage with the support projections, so as to rotatably support the cover relative to the torque member.

7. The cap device in accordance with claim 1, wherein the torque member includes a frangible portion that is readily breakable by external force applied to the handle mechanism.

8. The cap device in accordance with claim 7, wherein the frangible portion includes frangible grooves arranged along an outside rim of the torque member, the frangible portions being configured to be breakable by a weaker force than other parts of the torque member.

9. The cap device in accordance with claim 8, further comprising a handle attachment mechanism that is configured to rotatably support the handle mechanism on a circumference of the torque member, the frangible grooves being arranged around on an inner circumference of the handle attachment mechanism.

10. A cap device that is detachable to a tank opening, the cap device comprising:

a closer that closes the tank opening; a handle mechanism operable to open and close the tank opening;

a disk-shaped torque member that is rotatably mounted on the closer, the torque member being configured to transmit rotational torque applied to the handle mechanism to open and close the tank opening to the closer; and a plate attachment mechanism that rotatably attaches the torque member to the closer, wherein the plate attachment mechanism is configured such that part of the closer is elastically deformed by an external force applied to the handle mechanism, thereby detaching the torque member from the closer.

* * * * *